(12) United States Patent
Gomaa et al.

(10) Patent No.: US 10,370,606 B2
(45) Date of Patent: Aug. 6, 2019

(54) NON-EQUILIBRIUM PLASMA-ASSISTED METHOD AND SYSTEM FOR REFORMULATING AND/OR REDUCING TAR CONCENTRATION IN GASIFICATION DERIVED GAS PRODUCT

(71) Applicant: Plasco Energy Group Inc., Ottawa (CA)

(72) Inventors: Islam Gomaa, Ottawa (CA); Thomas Nunnally, Philadelphia, PA (US); Andreas Tsangaris, Ottawa (CA); Graeme Hay, Kanata (CA); Zhiyuan Shen, Ottawa (CA)

(73) Assignee: Plasco Conversion Technologies Inc., Ottawa, Ontario (CA)

( * ) Notice: Subject to any disclaimer, the term of this patent is extended or adjusted under 35 U.S.C. 154(b) by 131 days.

(21) Appl. No.: 15/028,261

(22) PCT Filed: Dec. 6, 2013

(86) PCT No.: PCT/CA2013/050939
§ 371 (c)(1),
(2) Date: Apr. 8, 2016

(87) PCT Pub. No.: WO2015/051440
PCT Pub. Date: Apr. 16, 2015

(65) Prior Publication Data
US 2016/0244683 A1    Aug. 25, 2016

Related U.S. Application Data

(60) Provisional application No. 61/889,104, filed on Oct. 10, 2013.

(51) Int. Cl.
*C10K 3/00* (2006.01)
*H05H 1/28* (2006.01)
(Continued)

(52) U.S. Cl.
CPC .............. *C10K 3/005* (2013.01); *C10K 3/006* (2013.01); *H05H 1/2406* (2013.01); *H05H 1/28* (2013.01);
(Continued)

(58) Field of Classification Search
None
See application file for complete search history.

(56) References Cited

U.S. PATENT DOCUMENTS

| 5,993,761 A | 11/1999 | Czernichowski et al. |
| 6,007,742 A * | 12/1999 | Czernichowski ...... B01J 19/088 204/157.15 |

(Continued)

FOREIGN PATENT DOCUMENTS

| AU | 2005-201370 A1 | 10/2006 |
| CA | 2502382 A1 | 9/2006 |

(Continued)

OTHER PUBLICATIONS

International Search, (PCT-CA2013-050939), dated Jul. 7, 2014, 8 pages.
(Continued)

*Primary Examiner* — Kishor Mayekar
(74) *Attorney, Agent, or Firm* — Adsero IP

(57) ABSTRACT

A method and apparatus is described for reformulating raw gas and/or reducing and/or converting the tar in a raw gas from a gasification reaction. More specifically, a gas reformulating system having a gas reformulating chamber, one or more sources of or means for generating non-equilibrium plasma, and optionally one or more oxygen source(s) inputs and control system is provided. Methods of reformulation and/or reducing the tar concentration in a raw gas from a gasification reaction that uses non-equilibrium plasma are also provided.

15 Claims, 29 Drawing Sheets

(51) Int. Cl.
  *H05H 1/44* (2006.01)
  *H05H 1/24* (2006.01)
  *H05H 1/46* (2006.01)
  *H05H 1/48* (2006.01)

(52) U.S. Cl.
  CPC ........ *H05H 1/44* (2013.01); *C10J 2300/1618* (2013.01); *H05H 2001/4607* (2013.01); *H05H 2001/481* (2013.01); *H05H 2240/20* (2013.01); *H05H 2245/121* (2013.01)

(56) References Cited

U.S. PATENT DOCUMENTS

| | | |
|---|---|---|
| 6,572,837 B1 | 6/2003 | Holland et al. |
| 6,606,855 B1 | 8/2003 | Kong et al. |
| 6,991,768 B2 | 1/2006 | Keras et al. |
| 7,459,594 B2 | 12/2008 | Czernichowski et al. |
| 7,832,344 B2 | 11/2010 | Capote et al. |
| 7,867,457 B2 | 1/2011 | Gutsol et al. |
| 8,110,155 B2 | 2/2012 | Fridman et al. |
| 8,173,075 B2 | 5/2012 | Gutsol et al. |
| 8,323,363 B2 | 12/2012 | Bingue et al. |
| 8,357,873 B2 | 1/2013 | Foret |
| 8,361,401 B2 | 1/2013 | Fridman et al. |
| 8,361,404 B2 | 1/2013 | Gutsol et al. |
| 2003/0084613 A1 | 5/2003 | Futamura et al. |
| 2005/0023128 A1 | 2/2005 | Keras et al. |
| 2007/0186474 A1 | 8/2007 | Rabovitser et al. |
| 2008/0173534 A1 | 7/2008 | Da Costa et al. |
| 2009/0060805 A1 | 3/2009 | Muradov et al. |
| 2009/0100752 A1 | 4/2009 | Sessa et al. |
| 2010/0003556 A1 | 1/2010 | Hartvigsen et al. |
| 2012/0227683 A1* | 9/2012 | Scott ............... C10K 1/046 123/3 |
| 2014/0162154 A1 | 6/2014 | Hartvigsen et al. |
| 2016/0194202 A1* | 7/2016 | Rabinovich ............ B01J 19/088 252/373 |

FOREIGN PATENT DOCUMENTS

| | | |
|---|---|---|
| CA | 2543777 A1 | 11/2006 |
| EP | 1920815 A2 | 5/2008 |
| WO | WO-2004-085038 A1 | 10/2004 |
| WO | WO-2008-055337 A1 | 5/2008 |
| WO | WO-2008-138117 A1 | 11/2008 |
| WO | WO 2011/119274 * | 9/2011 |
| WO | WO-2011-119274 A1 | 9/2011 |

OTHER PUBLICATIONS

"IEEE Conference Program, ICOPS 2012", The 39th IEEE International Conference on Plasma Science, Jul. 8-12, 2012, pp. 1-158, Edinburgh, Scotland.

Czernichowski, et al., "GlidArc-assisted reforming of gasoline and diesel oils into synthesis gas."

D'Anna, et al., "Detailed Modeling of the Molecular Growth Process in Aromatic and Aliphatic Premixed Flames," Energy & Fuels, 2005, pp. 79-86, vol. 19, No. 1.

Fridman, "Plasma-Chemical Fuel Conversion and Hydrogen Production," Plasma Chemistry, 2008, pp. 678-681, Cambridge University Press, Cambridge.

Fridman, et al., "Characteristics of Gliding Arc and its Application in Combustion Enhancement," Journal of Propulsion and Power, Nov.-Dec. 2008, vol. 24, No. 6.

Gutsol, "Warm Discharges for Fuel Conversion," Handbook of Combustion vol. 5: New Technologies, 2010, pp. 323-353, Wiley-VCH Verlag GmbH & Co. KGaA, Weinheim, Germany.

Gutsol, et al., "Combustion-assisted plasma in fuel conversion," Journal of Physics D: Applied Physics, 2011, pp. 1-14, vol. 44.

Trushkin, et al., "Decomposition of Toluene in a Steady-State Atmospheric-Pressure Glow Discharge," Plasma Physics Reports, 2013, pp. 167-182, vol. 39, No. 2.

Shukla, et al., "Comparative study on the growth mechanisms of PAHs." Combustion and Flame, 2011, pp. 369-375, vol. 158.

Du, et al., "Decomposition of toluene in a gliding arc discharge plasma reactor," Plasma Sources Science and Technology, 2007, pp. 791-797, vol. 16.

Kalra, et al., "Gliding Arc Discharges as a Source of Intermediate Plasma for Methane Partial Oxidation," IEEE Transactions on Plasma Science, Feb. 2005, pp. 32-41, vol. 33, No. 1.

Sutton, et al., "Review of literature on catalysts for biomass gasification," Fuel Processing Technology, 2001, pp. 155-173, vol. 73.

Odemyemi, et al., "Gliding Arc Plasma-Stimulated Conversion of Pyrogas into Synthesis Gas" IEEE Transactions on Plasma Science, Feb. 13, 2012, pp. 1-7, vol. 40, No. 4.

Odeyemi, et al., "Plasma assisted conversion of pyrogas," 2010 Abstracts IEEE International Conference on Plasma Science, Jun. 20-24, 2010, Norfolk, VA, Print ISBN: 978-1-4244-5474-7.

Odeyemi, et al., "Plasma assisted conversion of pyrogas," IEEE Graduate Forum, Annual Research Syposium, 2010, Program Booklet, Feb. 26, 2010, Philadelpia, USA.

Odeyemi, et al., "Glid ARC Plasma Conversion of Pyrolysis Gas Into Syngas," AIChE Spring Meeting and Global Congress on Process Safety, Mar. 14, 2011.

Odeyemi, et al., "Gliding Arc Plasma-Stimulation Conversion of Pyrogas into Synthesis Gas," IEEE Transactions on Plasma Science, 2012, pp. 1124-1130, vol. 40, No. 4.

Odeyemi, et al., "Non Equilibrium Gliding Arc Plasma Reforming of Pyrolysis Gas Fuel," Abstract Submitted for the GEC10 Meeting of the American Physical Society, Jun. 2, 2010, Drexel Plasma Institute, Drexel University, Philadelphia, USA.

Odeyemi, et al., "Non equilibrium plasma conversion of pyrogas into synthesis gas," Abstract.

Petitpas, et al., "A comparative study of non-thermal plasma assisted reforming technologies," International Journal of Hydrogen Energy, 2007, pp. 2848-2867, vol. 32.

Chernets, et al., "Characteristics of high-power gliding arc plasma reformer for industrial applications," Abstract, A.J. Drexel Plasma Institute, Drexel University, Camden, USA.

Chernets, et al., "Development of high-power plasma reformers and power supply for large scale applications," International Symposium on Plasma Chemistry 20, Jul. 24-29, 2011, Philadephia, USA.

Glassman, "Soot formation in combustion processes." Twenty-Second Symposium (International) on Combustion/The Combustion Institute, 1988, pp. 295-311, vol. 22, No. 1.

Hartvigsen, et al., "Non-thermal Plasma Reforming of Refractory Tars and Oils Generated by Biomass Gasification," 2010 AIChE Spring Meeting and Global Congress on Process Safety, Mar. 22, 2010.

Van Durme, et al., "Abatement and degradation pathways of toluene in indoor air by positive corona discharge," Chemosphere, 2007, pp. 1821-1829, vol. 68, No. 10.

Rollier, et al., "Experimental Study on Gasoline Reforming Assisted by Nonthermal Arc Discharge," Energy & Fuels, 2008, pp. 566-560, vol. 22.

Bromberg, et al., "Hydrogen manufacturing using low current, non-thermal plasma boosted fuel converters," Proceedings of the Symposium on Energy for the 21st Century: Hydrogen Energy, Apr. 2001, San Diego, CA.

Bromberg, et al., "Plasma Catalytic Reforming of Methane," Abstract for Proceedings of the 1998 U.S. DOE Hydrogen Program Review, 1998.

Bromberg, et al., "Plasma catalytic reforming of methane." International Journal of Hydrogen Energy, 1999, pp. 1131-1137, vol. 24.

Frost, et al., "Advanced Fossil Energy Utilization: (95d) Non-Thermal Plasma Reforming of Refractory Tars and Oils Generated by Biomass Gasification," 2010 AIChE Spring Meeting & 6th Global Congress on Process Safety, Mar. 23, 2010.

Frost, et al., "Advanced Fossil Energy Utilization: (95e) Non-Thermal Plasma Logistic Fuel Reformer for TARDEC," 2010 AIChE Spring Meeting & 6th Global Congress on Process Safety, Mar. 23, 2010.

(56) References Cited

OTHER PUBLICATIONS

Frost, et al., "Emerging Energy Frontiers in Research: (55b) Conversion of High Sulfur Fuels to Synthesis Gas for Fuel Cells," 2009 AIChE Spring Meeting & 5th Global Congress on Process Safety, Apr. 28, 2009.
Frost, et al., "Fuels and Petrochemicals Division—Jointly Co-sponsored with ACS: (143e) High Temperature Co-Electrolysis of Steam and Carbon Dioxide to Produce Synthesis Gas for Fischer Tropsch Synthetic Fuels," 2008 AIChE Spring Meeting & 4th Global Congress on Process Safety, Apr. 8, 2008.
Frost, et al., "Sustainable Engineering Forum: (13f) Reforming of Residual Tars and Oils from Biomass Gasification," AIChE 2011 Annual Meeting, Oct. 17, 2011.
Yu, et al., "Decomposition of Naphthalene by dc Gliding Arc Gas Discharge," Journal of Physical Chemistry A, 2010, pp. 360-368, vol. 114.
Frenklach, "Reaction mechanism of soot formation in flames," Physical Chemistry Chemical Physics, 2002, pp. 2028-2037, vol. 4.
Kamphus, et al., "Formation of small PAHs in laminar premixed low-pressure propene and cyclopentene flames: Experiment and modeling." Combustion and Flame, 2008, pp. 28-59, vol. 152.
Ni, et al., "Naphthalene decomposition in a DC corona radical shower discharge," Journal of Zhejiang University—Science A (Applied Physics & Engineering), 2011, pp. 71-77, vol. 12, No. 1.
Gallagher, Partial Oxidation and Autothermal reforming of Heavy Hydrocarbon Fuels with Non-equilibrium Gliding Arc Plasma for Fuel Cell Applications, Ph.D. Thesis, Feb. 2010.
Gallagher, et al., "On-board plasma-assisted conversion of heavy hydrocarbons into synthesis gas," Fuel, 2010, pp. 1187-1192, vol. 89.
Lim, et al., "Light Tar Decomposition of Product Pyrolysis Gas from Sewage Sludge in a Gliding Arc Plasma Reformer," Environmental Engineering Research, Jun. 2012, pp. 89-94, vol. 17, No. 2.
Tippayawong, et al., "Investigation of Light Tar Cracking in a Gliding Arc Plasma System," International Journal of Chemical Reactor Engineering, 2010, pp. 1-14, vol. 8.
Monteiro Eliott, et al., "Tar Reforming under a Microwave Plasma Torch," Energy Fuels, 2013, pp. 1174-1181, vol. 27.
Anis, et al., "Tar reduction in biomass producer gas via mechanical, catalytic and thermal methods: A review", Renewable and Sustainable Energy Reviews, 2011, pp. 2355-2377, vol. 15.
Nair, "Corona plasma for tar removal," Ph.D. Thesis, 2004, Technische Universiteit Eindhoven, Netherlands, ISBN 90-386-2666-5.
Kim, et al., "Hydrogen-rich gas production from a biomass pyrolysis gas by using a plasmatron," International Journal of Hydrogen Energy, 2013, pp. 14458-14466, vol. 38.
Nunnally, et al., "Dissociation of CO2 in a low current gliding arc plasmatron," Journal of Physics D: Applied Physics, 2011, pp. 1-7, vol. 44.
Nunnally, et al., "Dissociation of H2S in non-equilibrium gliding arc "tornado" discharge," International Journal of Hydrogen Energy, 2009, pp. 7618-7625, vol. 34, No. 18.
Nunnally, et al., "Gliding arc plasma oxidative steam reforming of a simulated syngas containing naphthalene and toluene," International Journal of Hydrogen Energy, 2014, pp. 11976-11989, vol. 39.
Bityurin, et al., "Simulation of Naphthalene Conversion in Biogas Initiated by Pulsed Corona Discharges," IEEE Transactions on Plasma Science, Jun. 2009, pp. 911-919, vol. 37, No. 6.
Rusanov, et al., "Physics of a chemically active plasma with nonequilibrium vibrational excitation of molecules," Soviet Physics-Uspekhi, Jun. 1, 1981, pp. 447-474, vol. 24, No. 6.
Mista, et al., "Decomposition of toluene using no-thermal plasma reactor at room temperature," Catalysis Today, 2008, pp. 345-349, vol. 137.
Yang, et al., "Naphthalene destruction performance from tar model compound using a gliding arc plasma reformer," Korean Journal of Chemical Engineering, 2011, pp. 539-543, vol. 28, No. 2.
Chun, et al., "Destruction of anthracene using a gliding arc plasma reformer," Korean Journal of Chemical Engineering, 2011, pp. 1713-1720, vol. 28, No. 8.
Chun, et al., "Destruction of Biomass Tar Using a Gliding Arc Plasma Reformer," International Journal of Environmental Protection, Dec. 2012, pp. 1-8, vol. 2, No. 12.
Chun, et al., "Removal characteristics of tar benzene using the externally oscillated plasma reformer," Chemical Engineering and Processing, 2012, pp. 65-74, vols. 57-58.
Bo, et al., "Simultaneous removal of ethyl acetate, benzene and toluene with gliding arc gas discharge," Journal of Zhejiang University Science A, 2008, pp. 695-701, vol. 9, No. 5.
Ferenc, et al., "Use of GlidArc Reactor for Decomposition of Toluene Vapours in Hot Exhausts," High Technology Plasma Processes, 2004, pp. 31-37, vol. 8, No. 1.
Sun, et al., "Optical diagnostics of a gliding arc," Optics Express, Mar. 11, 2013, pp. 6028-6044, vol. 21, No. 5.

* cited by examiner

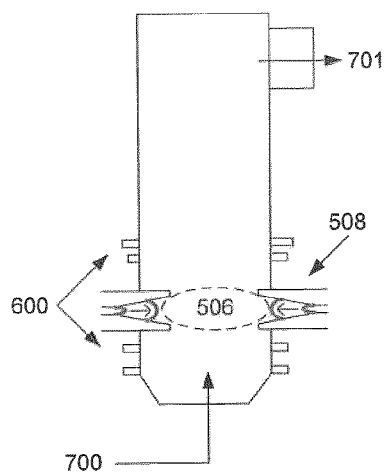
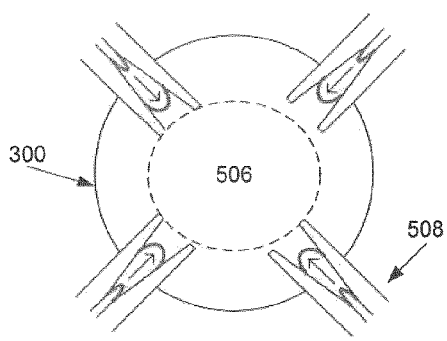
Figure 2E          Figure 2F
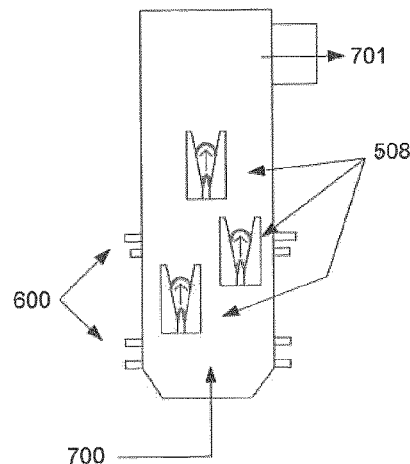
Figure 2G

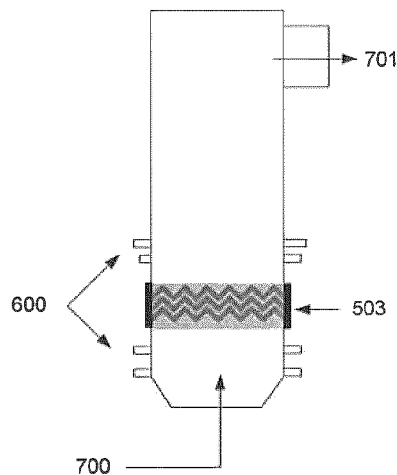
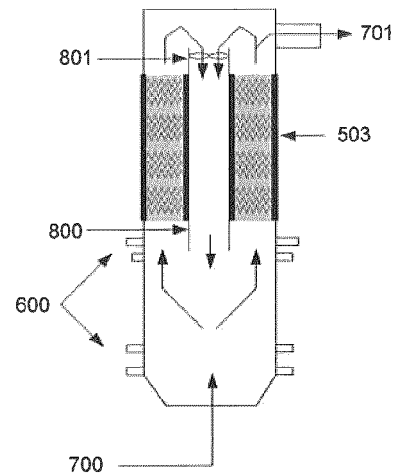
Figure 3A
Figure 3B
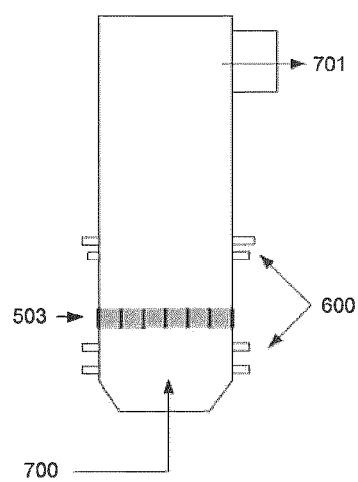
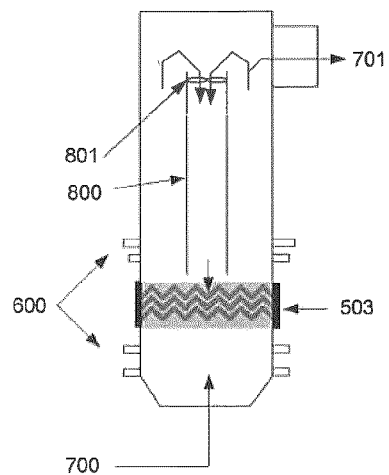
Figure 3C
Figure 3D A
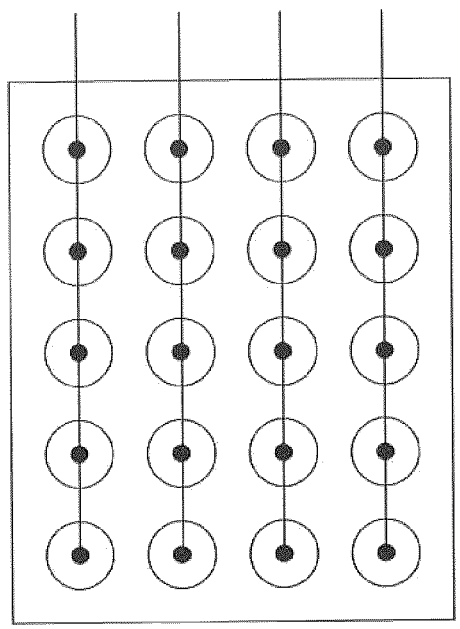
B
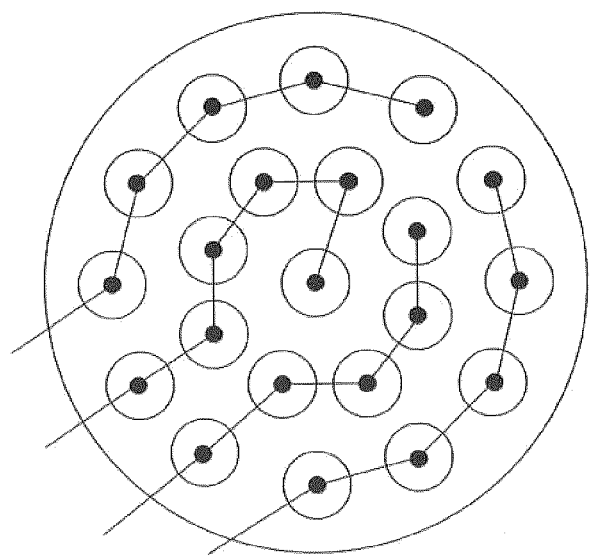
Figures 9 A-B A
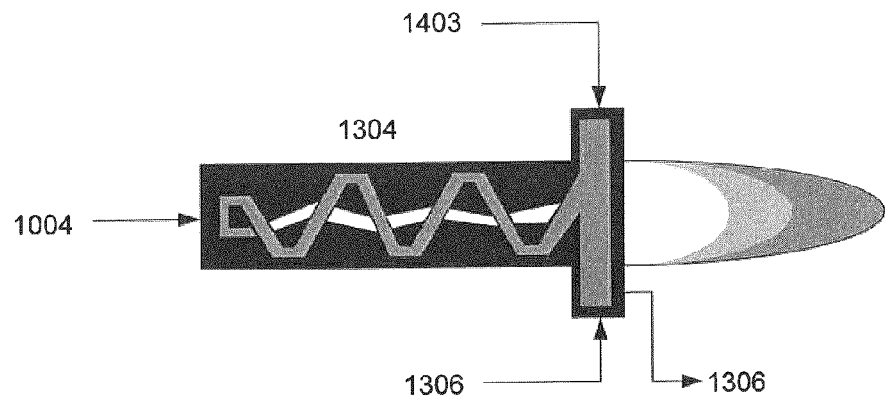
B
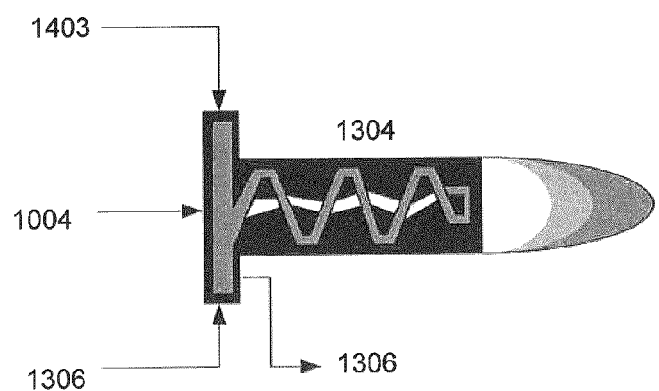
Figures 10 A-B

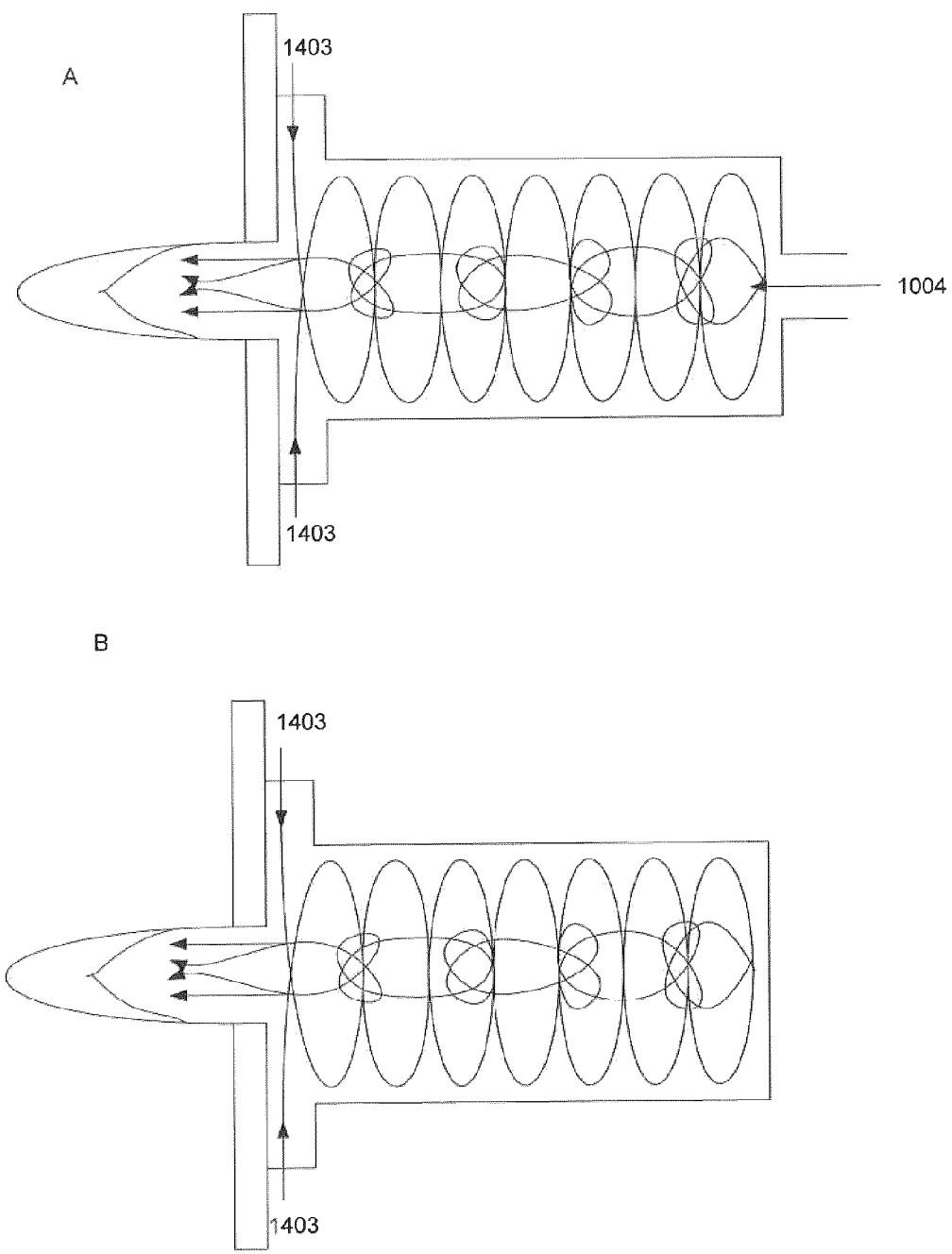
Figures 11 A-B

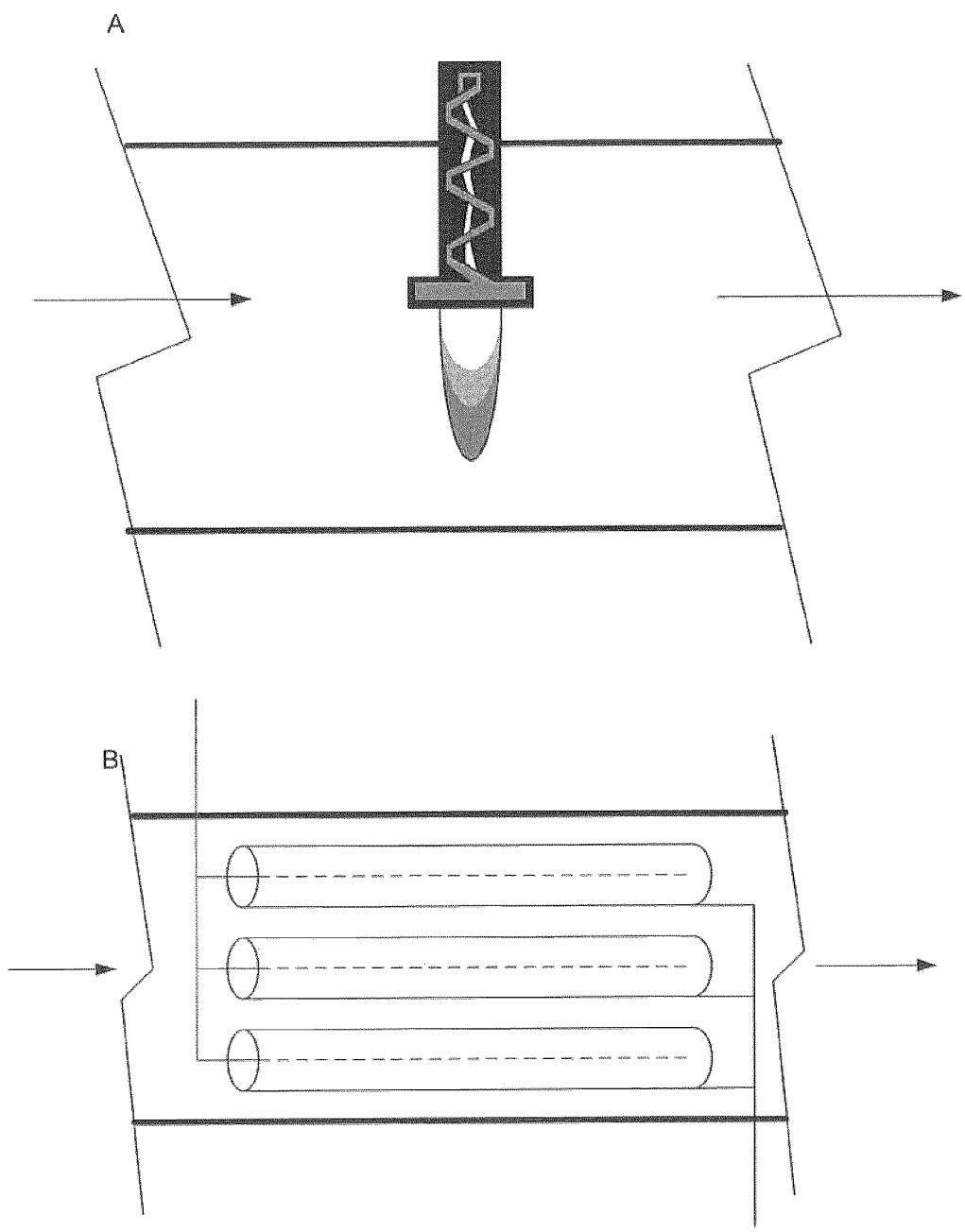
Figures 12 A-B

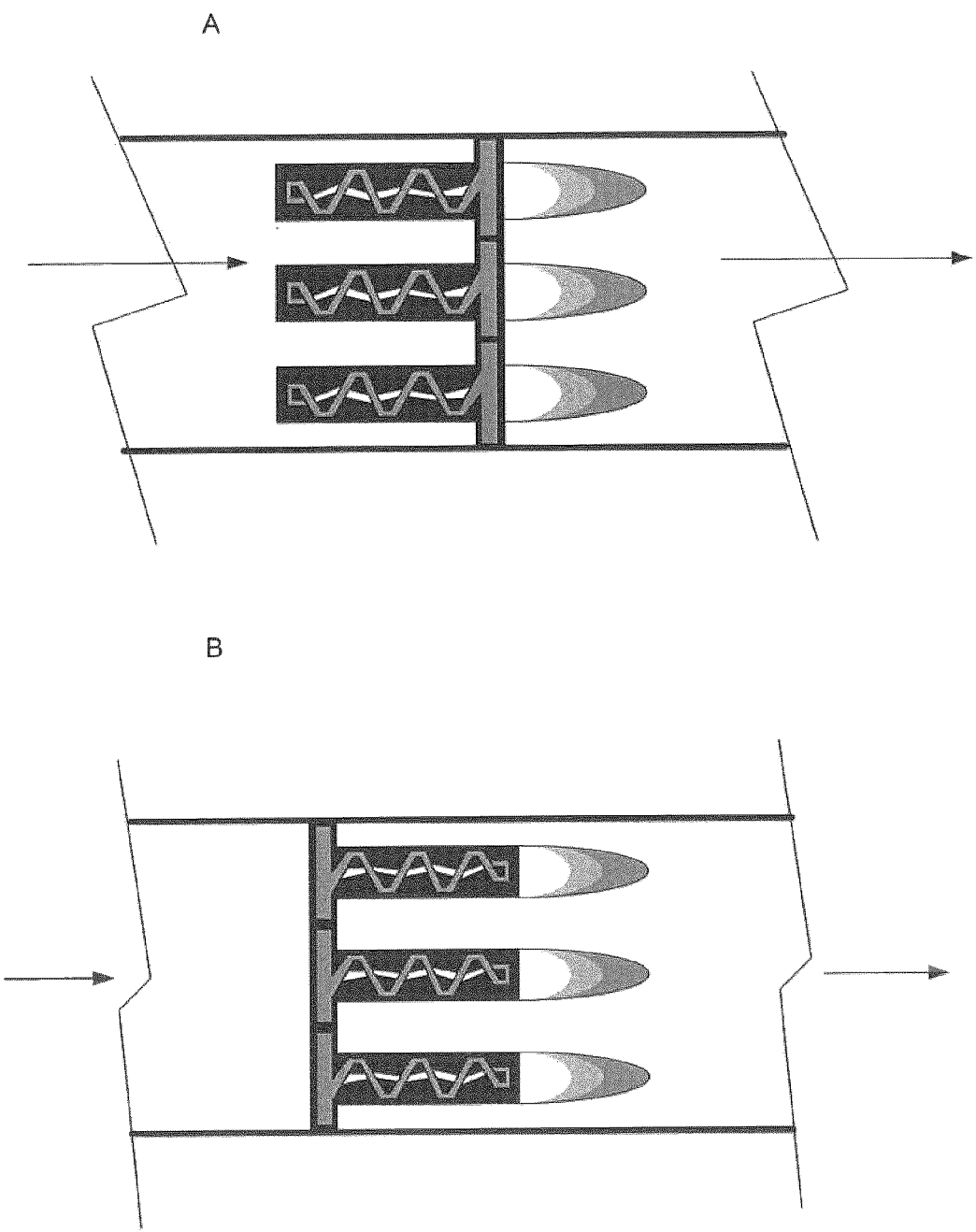
Figures 13 A-B

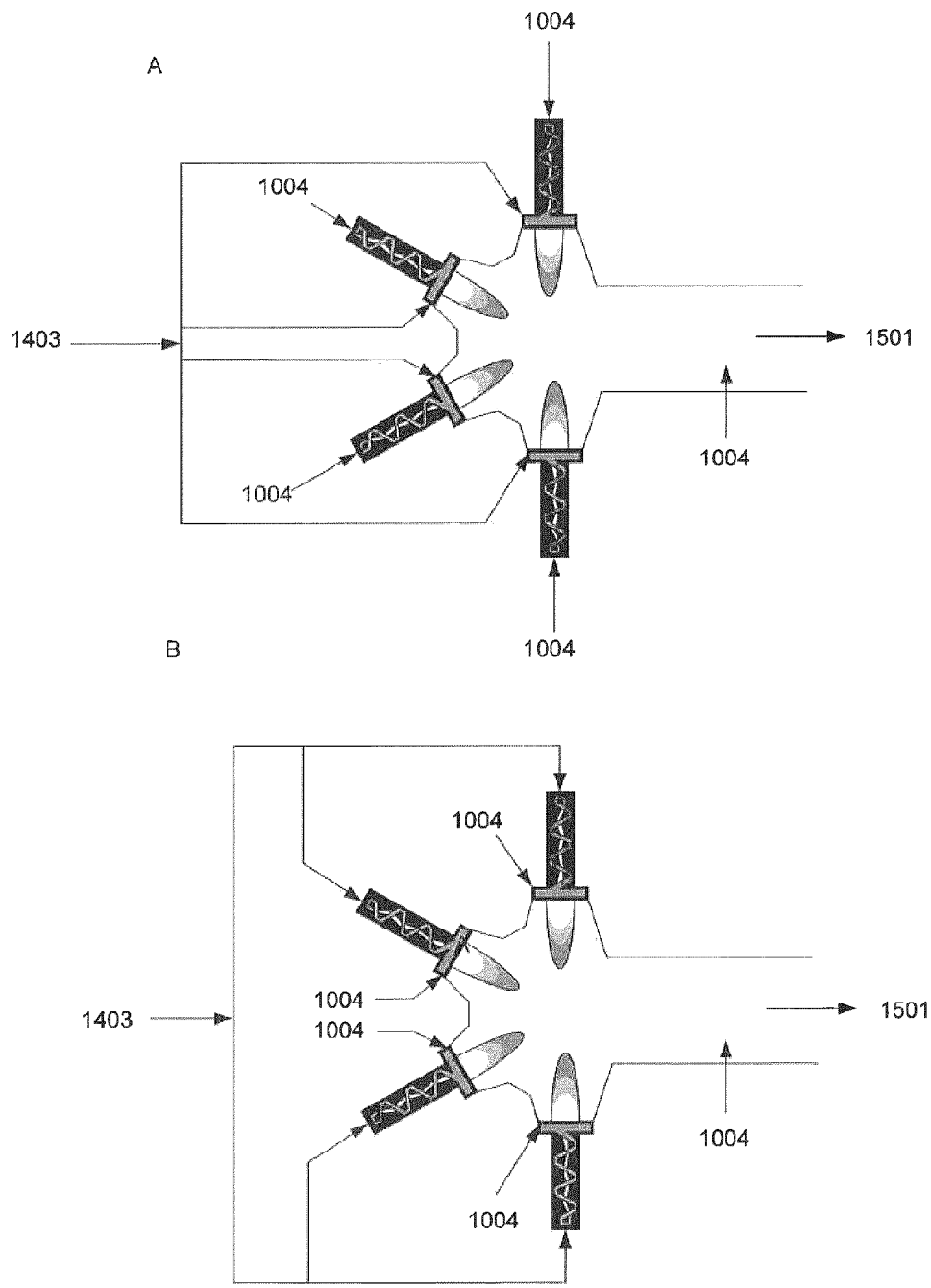
Figures 14 A-B

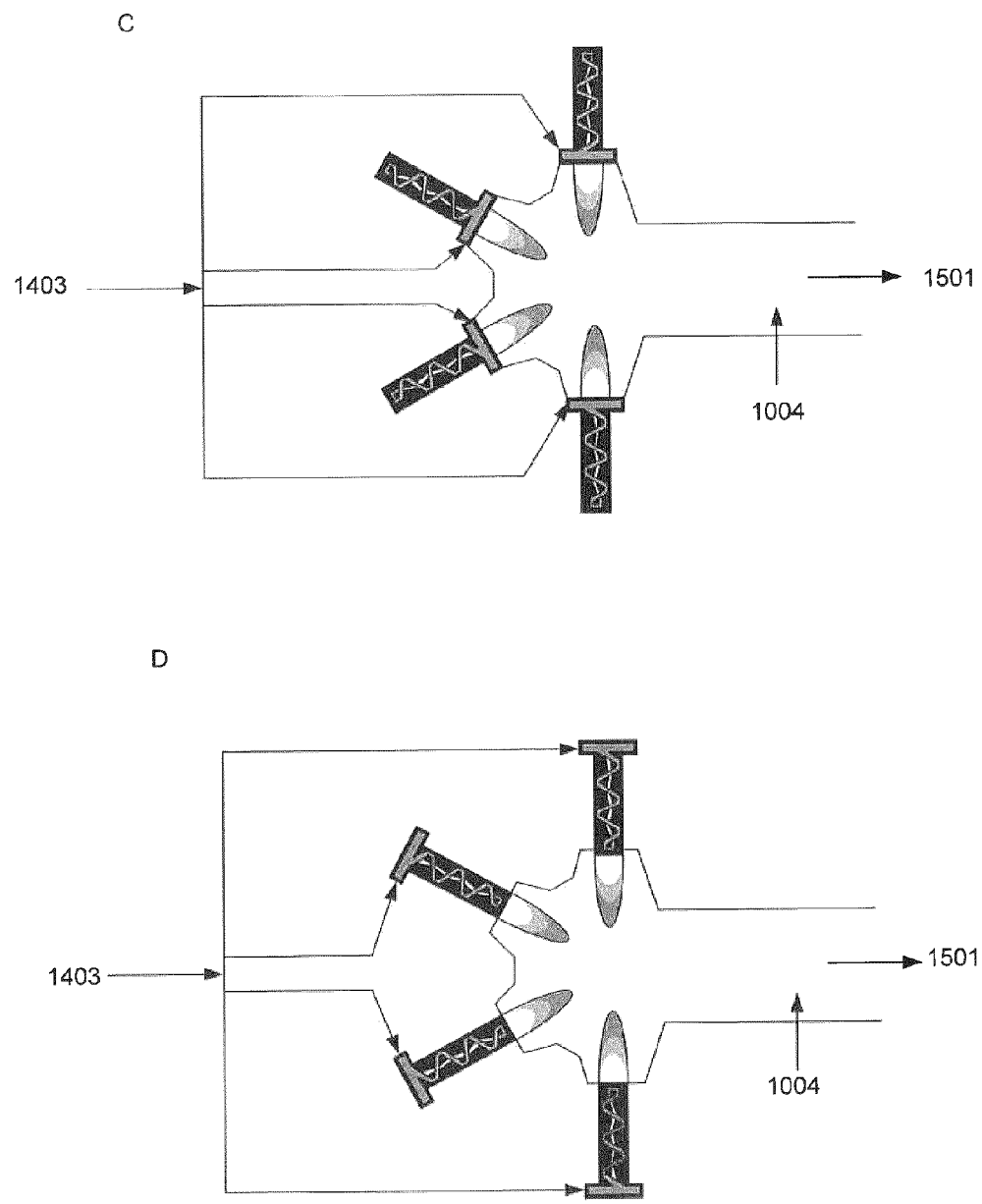
Figures 14C-D

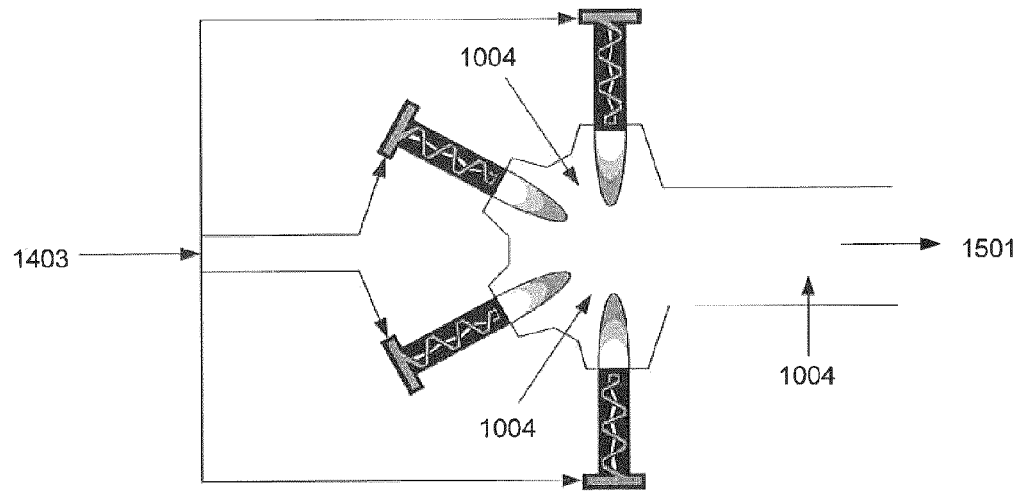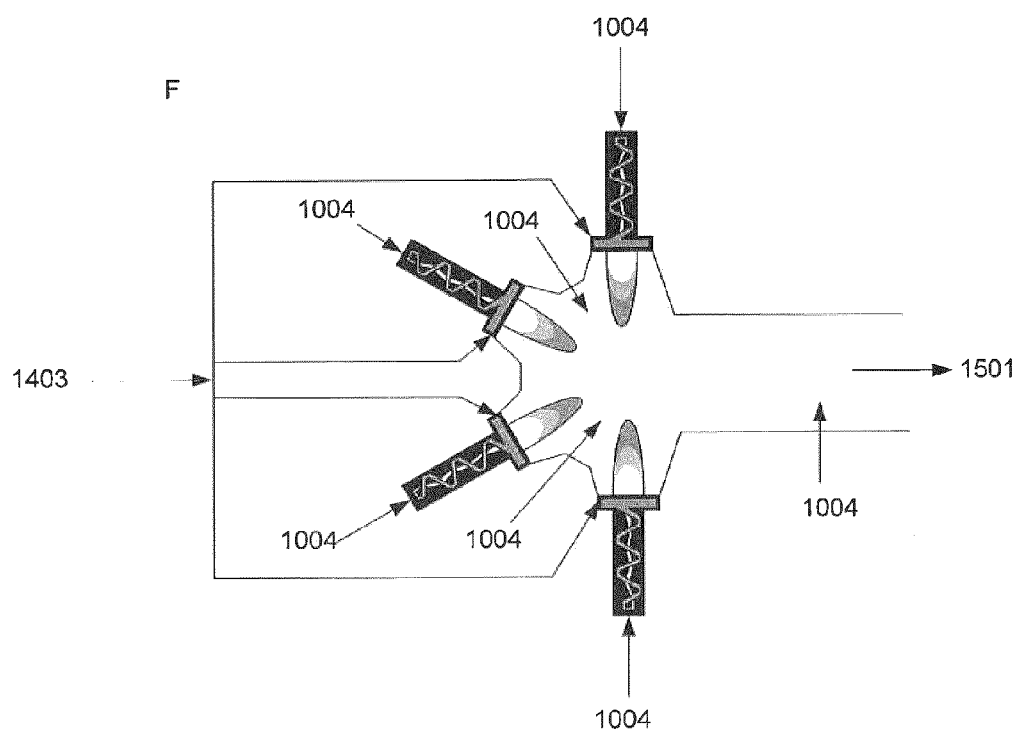
Figures 14 E-F

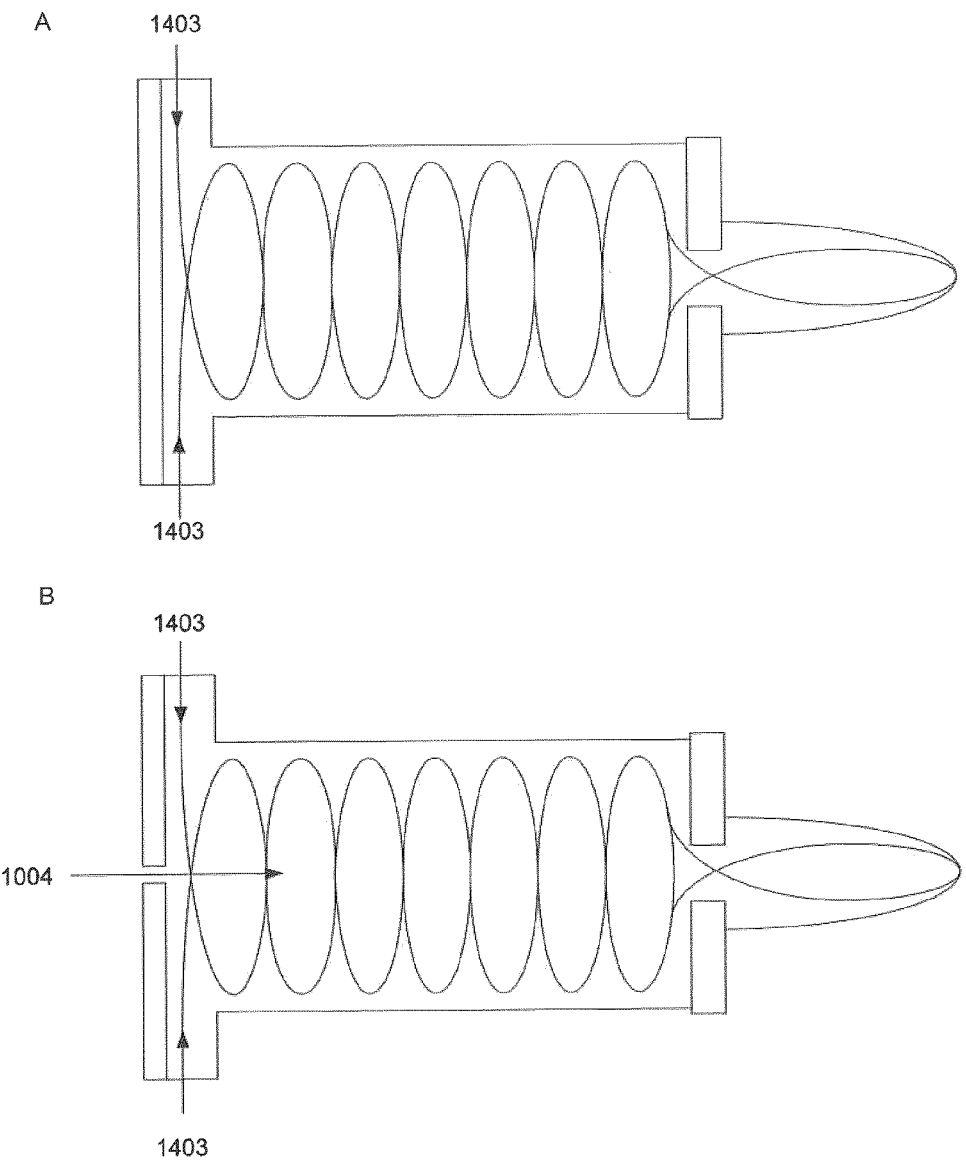
Figures 15 A-B

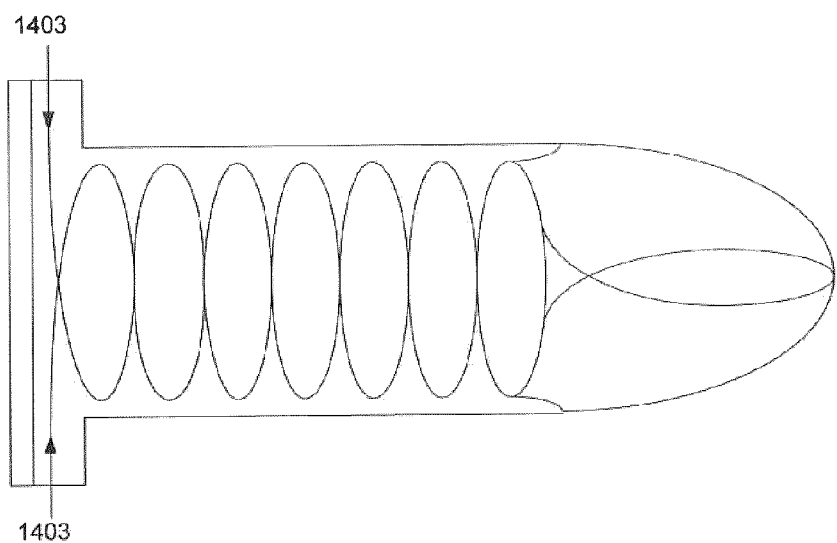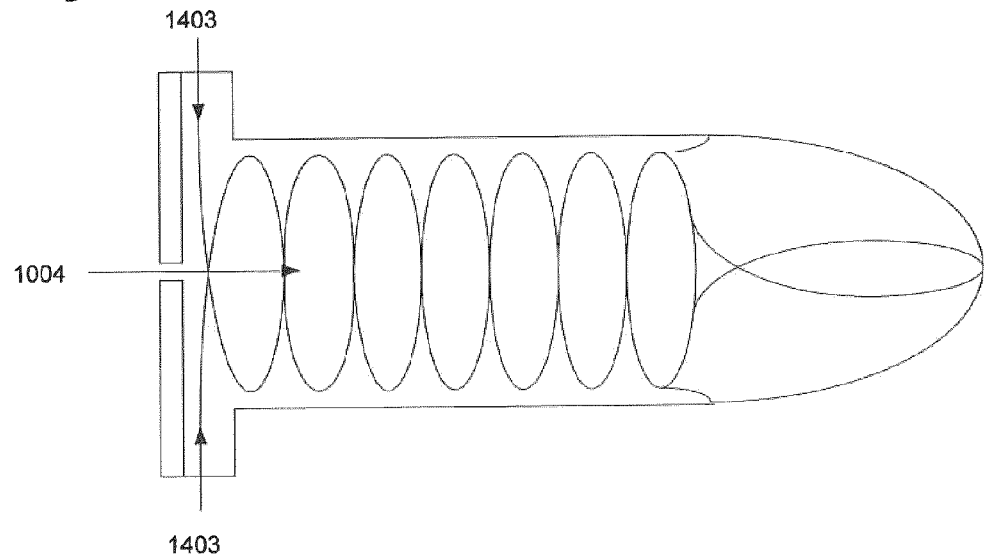
Figures 15 C-D

NON-EQUILIBRIUM PLASMA-ASSISTED METHOD AND SYSTEM FOR REFORMULATING AND/OR REDUCING TAR CONCENTRATION IN GASIFICATION DERIVED GAS PRODUCT

RELATED APPLICATIONS

This application is a 35 U.S.C. § 371 national phase application of PCT/CA2013/050939 (WO 2015/051440) filed on Dec. 6, 2013, entitled "A Non-Equilibrium Plasma-Assisted Method and System for Reformulating and/or Reducing Tar Concentration in Gasification Derived Gas Product", which application claims the benefit of U.S. Provisional Application Ser. No. 61/889,104, filed Oct. 10, 2013 which is incorporated herein by reference in its entirety.

FIELD OF THE INVENTION

This invention pertains to the field of syngas production via carbonaceous feedstock gasification. In particular, it relates to a non-equilibrium plasma-assisted method and system for reformulating and/or reducing tar concentration in gasification derived gas product.

BACKGROUND TO THE INVENTION

The gas produced as a result of a variety of material conversion processes such as pyrolysis, gasification, plasma gasification and/or plasma melting may be utilized in a variety of downstream applications including power generation, industrial synthesis of chemicals and in the production of liquid fuels, stored for later use or flared off.

The product gas formed via the gasification of carbonaceous feedstock and in particular low quality feedstocks such as municipal solid waste (MSW) contains CO, $H_2$, $CO_2$, $CH_4$, $H_2O$, and $N_2$ as well as organic and inorganic impurities and particulates. A wide range of organic molecules are present in the product gas and include low molecular weight hydrocarbons such as acetylene, ethylene as well as high molecular weight hydrocarbons including polycyclic aromatic hydrocarbons (PAH), such as naphthalene and pyrene. The low molecular weight hydrocarbons can be used as fuel in gas turbine or engine applications. In contrast, the high molecular weight hydrocarbons are problematic in downstream applications and may cause plugging or clogging of downstream equipment. High molecular weight hydrocarbons are generally referred to as "tars," and can be defined as the downstream condensable hydrocarbon component in the product gas.

Tar components found in gasification product gas include benzene, toluene, naphthalene, pyrene and indene. Once formed, tars can be difficult to decompose with the thermal requirements for decomposition, varying depending upon process parameters and the individual molecule. Tar removal strategies are known in the art but can be very expensive and could exhibit low removal efficiency. If tar is removed as opposed to being converted to lower molecular weight components, there is a loss in potential heating value of the gas and could still pose a downstream problem.

Plasma reforming of tars, modeled primarily with surrogate tar molecules including naphthalene and/or toluene, has been studied in a variety of discharges including microwave, corona and gliding arc discharges. Detailed studies have been conducted in corona discharges for the conversion of toluene and naphthalene. Gliding arc has been studied for conversion of a variety of tars including benzene, toluene, methyl-naphthalene, fluorene, anthracene, and pyrene. Although these studies demonstrated high removal efficiencies, many factors were not realistic for industrial application including: high specific energy input, unrealistic input gas, low tar concentration, low flow rate, and low energy efficiency.

Plasma has been used as both a source of intense heat, and as a source of free electrons that can be used to initiate and drive many chemical processes requiring the dissociation of molecules into (reactive) dissociation fragments.

Based on the relative temperatures of the electrons, protons and neutrons, plasmas are classified as "thermal" or "non-thermal". Thermal plasma atoms have electrons and nucleus particles at the same temperature and are said to be in thermal equilibrium. In other words electron temperature and gas temperature are in equilibrium with each other.

Non-thermal plasmas, also referred to as low enthalpy plasma, "cold plasma", non-equilibrium plasma or "low-pressure" plasma, are characterized by a low gas temperature but much higher energy distribution of the electrons than that of atom nucleus. "Cold plasma" or "low-temperature plasma" or "low enthalpy plasma" is a partly ionized gas, which is generated in a high-voltage electric field in a low pressure.

Non-equilibrium, low-temperature plasmas are known in the art to destroy relatively low concentrations of volatile organic compounds at atmospheric pressure and are particularly attractive for treatment of low-level waste concentrations and for dealing with compounds that resist treatment by standard chemical means. These low-temperature plasma processing techniques generally involve either high energy electron-beam irradiation or electrical discharge methods, such as gliding arc, pulsed corona, dielectric barrier, capillary, hollow cathode, surface, and packed-bed corona discharge. All of these techniques rely upon the fact that electrical energy can produce electrons with much higher average kinetic energies than the surrounding gas-phase ions and molecules. These energetic electrons can interact with the background gas to produce highly reactive species (i.e., radicals, anions, cations, and secondary electrons) that will preferentially destroy pollutants.

Non-equilibrium plasma differs from thermal plasma with respect to their roles in plasma chemical kinetics. Thermal plasma is usually more powerful, whereas non-equilibrium plasma is more selective. Since concentrations of active species in non-equilibrium plasma can exceed those in thermal plasma by many orders of magnitude at the same gas temperature, the successful control of non-equilibrium plasma can permit chemical reactions to be manipulated in a desired direction and through an optimal pathway.

The well-known categories of non-equilibrium plasma are dielectric barrier discharge, gliding arc, reverse vortex gliding arc, direct-current (DC) and pulsed coronas, corona discharge, corona reactor, microwave plasma, electron-beam, micro-discharge and RF-driven discharge.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a non-equilibrium plasma-assisted method and system for reformulating and/or reducing tar concentration in gasification derived gas product. In accordance with an aspect of the invention, there is provided a system for reformulating a raw gas from a gasification reaction comprising a chamber having an input configured to receive gas from a gasification reaction and a gas output, means for forming an electrical discharge in the gas such that non-equilibrium plasma is formed, and optionally process additive inputs.

In accordance with some embodiments, the means for forming an electrical discharge is two or more electrodes.

In accordance with another aspect of the invention, there is provided a system for reformulating of a raw gas from a gasification reaction to a reformulated gas comprising a chamber having an input for receiving the raw gas; an output for releasing the reformulated gas; optionally one or more oxygen source(s) inputs in fluid communication with the chamber; and one or more sources of non-equilibrium plasma; wherein the plasma arc is formed within the raw gas, thereby converting the raw gas to reformulated gas.

In accordance with another aspect of the invention, there is provided a method for reformulating a raw gas from a gasification reaction into a reformulated gas, comprising the steps of delivering the raw gas at an inlet of a chamber; optionally injecting an oxygen source into the chamber; providing non-equilibrium plasma sources, wherein the non-equilibrium plasma arc is formed within the raw gas thereby producing the reformulated gas; and removing the reformulated gas from the chamber.

In accordance with another aspect of the invention, there is provided a method for reducing tar concentration of a raw gas from a gasification reaction, comprising the steps of delivering the raw gas from a gasification reaction to an inlet of a chamber; injecting an oxygen source and, when necessary, process additives into said chamber, such that the raw gas mixes with the oxygen source and process additives; and applying plasma from one or more non-equilibrium plasma sources to the mixed raw gas, oxygen source and process additives to promote conversion of tar molecules therein.

In accordance with another aspect of the invention, there is provided a method for reducing tar concentration and/or reformulating of a raw gas from a gasification reaction comprising inputting raw gas directly into a chamber; optionally injecting an oxygen source and/or process additives into said chamber, such that the raw gas mixes with the oxygen source and/or process additives, initiating an electrical discharge in the gas such that non-equilibrium plasma is formed. In this case, the whole gaseous mixture has the potential of becoming plasma itself; thus the close proximity and mixing of raw gas, air and other additives promote conversion of tar molecules therein.

In accordance with an embodiment of the invention, the method comprises the step of adjusting the air to fuel ratio. In some embodiments, air to fuel ratio is adjusted in view of tar concentration.

BRIEF DESCRIPTION OF THE DRAWINGS

These and other features of the invention will become more apparent in the following detailed description in which reference is made to the appended drawings.

FIG. 2 illustrates various embodiments of the GRS with gliding arc technology. FIG. 2E illustrates a GRS with gliding arc torches creating a charged non-equilibrium plasma field for the purpose of reformulation. FIG. 2F is an alternative view of the embodiment shown in FIG. 2E. FIG. 2G illustrates a GRS with torches at different levels, where torches are located along the chamber walls and non-equilibrium plasma is produced in the reactor at various locations along the GRS.

FIG. 3 illustrates various embodiments of the GRS with corona technology. FIG. 3A illustrates a GRS with a corona discharge (or pulse discharge) system 503. FIG. 3B illustrates a GRS whereby corona discharge is incorporated into the mixing element 802 of the system (not shown). FIG. 3C illustrates a GRS with an array of corona discharge generators. FIG. 3D illustrates a GRS with a corona discharge placed into a reformulation chamber with mixing technology through recirculation.

FIG. 5 illustrates embodiments whereby non-equilibrium plasma is used with mixing and cooling elements.

FIG. 6 illustrates embodiments where the corona plasma, and separately the gliding arc plasma are configured as and can be utilized to inject non-equilibrium plasma.

FIG. 7 illustrates embodiments where the plasma generator is a non-equilibrium plasma "torch"—such as electron beam, RF, and microwave plasma technologies.

FIG. 9A illustrates a pulse corona tube bundle for a square/rectangular reformulation chamber duct.

FIG. 9B illustrates a pulse corona tube bundle for a round reformulation chamber duct.

FIG. 10A illustrates a reverse vortex plasma chamber design.

FIG. 10B illustrates a forward gliding arc plasma chamber design. Gas 1403, additives 1004, non-equilibrium plasma torch 1304, and electricity ground 1306 are shown.

FIG. 11A illustrates one embodiment of the invention, showing a cross sectional area with flow patterns of a reverse vortex plasma generating device with optional supporting/stabilization air being added at the back.

FIG. 11B illustrates one embodiment of the invention, showing a cross sectional area with flow patterns of a reverse vortex plasma generating device with just the swirl gas. In this figure it is shown the gas 1403 and the additives 1004.

FIG. 12A illustrates one embodiment of the invention, showing a close up of a reverse vortex torch inserted into a gas channel.

FIG. 12B illustrates one embodiment of the invention, showing a close up of an array of pulse corona reactors (tube and wire design) inserted into a gas channel.

FIG. 13A illustrates one embodiment of the invention, showing a close up of an array of reverse vortex reactors passing all the gas through them, then going down to the reformulation chamber.

FIG. 13B illustrates one embodiment of the invention, showing a close up of an array of forward gliding arc reactors passing all the gas through them then going down to the reformulation chamber.

FIG. 14A illustrates one embodiment of the invention, where the incoming gas is fed into the front gliding arc of multiple non-equilibrium plasma reactors before being recombined in the reforming chamber, where the residence time and mixing ensures maximized conversion of unwanted components in the gas. This results in a clean reformulated gas, which can be sent to downstream processes. Also shown is the addition of "additives" into the plasma chambers. Additives including air, oxygen, water and steam may be used to increase reaction kinetics or to balance chemistry to adjust the final product's composition. Also shown is the optional addition point for additional additives or gas, which can be mixed into the reforming gas stream to balance further chemistry, raw gas 1403, additives 1004 and reformulated gas 1501.

FIG. 14B illustrates one embodiment of the invention where the incoming gas is fed as stabilizing gas into multiple non-equilibrium plasma reactors before being recombined in the reforming chamber, where the residence time and mixing ensures maximized conversion of unwanted components in the raw gas. This results in a clean reformulated gas which can be sent to downstream processes. In this embodiment "additives" are used to create the swirl in the plasma chambers. Optional addition point for additional additives or gas is shown.

FIG. 14C illustrates one embodiment of the invention where the incoming raw gas is fed into the front swirl of multiple non-equilibrium plasma reactors before being recombined in the reforming chamber, where the residence time and mixing ensures maximized conversion of unwanted components in the gas. This results in a clean reformulated gas which can be sent to downstream processes. Optional addition point for additional additives or gas is shown.

FIG. 14D illustrates one embodiment of the invention where the incoming raw gas is fed as swirl gas into the backs of multiple non-equilibrium plasma reactors before being recombined in the reforming chamber where the residence time and mixing ensures maximized conversion of unwanted components in the gas. This results in a clean reformulated gas which can be used in downstream processes.

FIG. 14E illustrates one embodiment of the invention where the incoming gas is fed as swirl gas into the backs of multiple non-equilibrium plasma reactors before being recombined in the reforming chamber, where the residence time and mixing ensures maximized conversion of unwanted components in the gas. The chamber is optionally configured to provide for the addition of process additives into the mixing region.

FIG. 14F illustrates one embodiment of the invention where the incoming raw gas is fed into the front swirl of multiple non-equilibrium plasma reactors before being recombined in the reforming chamber, where the residence time and mixing ensures maximized conversion of unwanted components in the gas. Additives including air, oxygen, water and steam may be used to increase reaction kinetics or to balance chemistry the final product's composition. The chamber is optionally configured to provide for the addition of process additives into the mixing region. Optional addition point for additional additives or gas is shown.

FIG. 15A illustrates one embodiment of the invention showing a cross-sectional view of a forward vortex reactor where a gas (1403) is added at the back of the reactor in a swirl pattern and exits out the front. The addition of a plasma arc/discharge in the reactor causes the gas to be converted to plasma and creates a plume out the front. Process additives 1004 may also be added.

FIG. 15B illustrates a cross-sectional view of a forward vortex reactor similar to that shown in FIG. 15A with the addition of a stabilizing gas that mixes with the swirl gas to promote the swirl and in part better overall conversion.

FIG. 15C illustrates a cross-sectional view of a forward vortex reactor where a gas is added at the back of the reactor in a swirl pattern and exits out the front. The addition of a plasma arc/discharge in the reactor causes the gas to be converted to plasma and creates an unhindered plume out the front.

FIG. 15D illustrates in this embodiment of the invention a cross-sectional view of a forward vortex reactor similar to that shown in FIG. 15C with the addition of a stabilizing gas that mixes with the swirl gas to promote the swirl and in part better overall conversion.

DETAILED DESCRIPTION OF THE INVENTION

Definitions

Figure 1A:
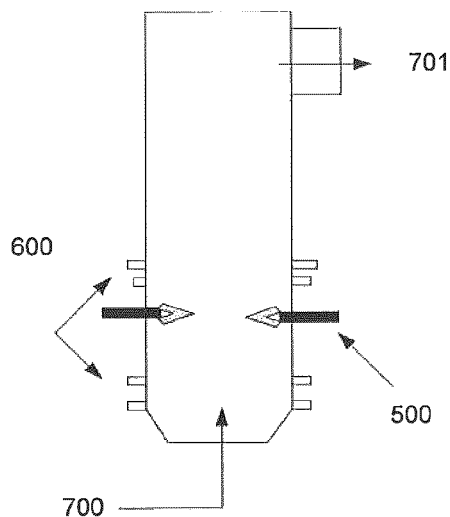
FIG. 1A illustrates a prior art system with two thermal plasma torches detailing the raw gas stream 700, process additive inputs 600, output gas stream 701 and thermal plasma torches 500.

Unless defined otherwise, all technical and scientific terms used herein have the same meaning as commonly understood by one of ordinary skill in the art to which this invention belongs.

As used herein, the term "about" refers to an approximately ±10% variation from a given value. It is to be understood that such a variation is always included in any given value provided herein, whether or not it is specifically referred to.

As used herein, the term "raw gas" means generally, a gas generated during the gasification process that has not been reformulated.

As used herein, the term "syngas" or a "reformulated gas" means generally, a gas generated during the gasification process that has been reformulated.

As used herein, the term "tar" means high molecular weight hydrocarbons which are generally defined as the downstream condensable hydrocarbon component in the product gas.

As used herein, the term "tar conversion" means the percent of total incoming "tar" converted into product components ($H_2$, CO, $CO_2$, and $C_6$ or lighter HC's) and can be determined via:

$$\eta_d = \frac{[C]_{in} - [C]_{out}}{[C]_{in}}, [\%]$$

where [C] is the tar concentration by volume and equation is based on the assumption that the raw gas flow rate, at the point of the inlet concentration measurement, equals the outlet gas flow rate.

As used herein, the term non-equilibrium plasma (NEP) or non-thermal plasma (NTP), or "cold plasma", or "low-pressure plasma" means plasma which will only have a slight thermal component to the gas; while, it mainly has a catalytic effect on the gas/particles components. Non-equilibrium plasma is generated in a high-voltage electric field. Furthermore, non-equilibrium plasma has much higher energy distribution to the electrons, which has a temperature of approximately 10,000 Kelvin, while heavy particles have a temperature in the range of 300-4000 Kelvin. Some examples of non-equilibrium plasma discharge include: dielectric barrier discharge, pulsed corona discharge, and gliding arc discharge. All of these plasma discharges have properties such that, electron energy (temperature) is significantly higher than the energy (temperature) of other plasma particles; hence, it is a non-equilibrium discharge.

Overview of the System

This invention provides a gas reformulating system (GRS) comprising a gas reformulating chamber having one or more raw gas inlets, one or more reformulated gas outlets, one or more means for generating or sources of non-equilibrium plasma, and optionally one or more oxygen source(s) inputs and/or a control system.

The invention provides a GRS for upgrading raw gas comprising volatile molecules that can include, for example, carbon monoxide, hydrogen, tar, light hydrocarbons, and carbon dioxide and contaminating particulate matter, such as soot and carbon black, produced during the gasification of carbonaceous feedstock. This GRS provides a sealed environment for containing and controlling the process. It uses plasma to disassociate the volatile molecules into their constituent elements that then recombine as a reformulated gas. Process additives such as air and/or oxygen and/or steam are optionally used to provide the necessary molecular species for recombination. The plasma process also removes unwanted substances such as paraffins, tars, chlorinated compounds among others, by decomposing and converting these unwanted substances to smaller molecules such as $H_2$ and CO. The GRS further optionally comprises a control system that regulates the process and thereby enables the process to be optimized.

The invention provides a method for converting tar in a raw gas to lower molecular weight constituents comprising the step of initiating an electrical discharge in the gas such that non-equilibrium plasma is formed.

The invention still further provides a method for reducing tar concentration of a raw gas from a gasification reaction, comprising the steps of delivering the raw gas from gasification reaction to an inlet of a chamber; injecting oxygen source and, when necessary, process additives into said chamber such that the raw gas mixes with the oxygen source and process additives; applying plasma from one or more non-equilibrium plasma sources to the mixed raw gas, oxygen source and process additives to promote conversion of tar molecules therein.

Optionally, the methods comprise the steps of adjusting moisture content and/or adjusting the temperature of the raw gas to at least about 350° C. In some embodiments, temperature of the raw gas is adjusted to at least about 650° C. In some embodiments, temperature of the raw gas is adjusted to at least about 850° C.

Non-Equilibrium Plasma Catalysis

The application of non-equilibrium plasma for fuel conversion and hydrogen production can be effective, because plasma is used not as a source of energy, but as a non-equilibrium generator of radicals and charged and excited particles. These non-equilibrium plasma-generated active species can lead to long-chain reactions of fuel conversion and hydrogen production. The energy required for fuel conversion and hydrogen production can be provided mostly by chemical energy of reagents and low-temperature heat in non-equilibrium plasma. The plasma-generated active species can stimulate this process and contribute a small fraction (on the level of approximately a couple percent) of the total process energy. This effect is usually referred to as plasma catalysis.

Quantum-mechanical repulsion between molecules, which provides the activation barrier even in the exothermic reactions of neutrals, can be suppressed by the charge-dipole attraction in the case of ion-molecular reactions. Thus rate coefficients of the reactions are substantially high. The effect obviously can be applied to both positive and negative ions. The absence of activation energies in exothermic ion-molecular reactions facilitates organization of chain reactions in ionized media.

Non-equilibrium plasma can stimulate specific reaction pathways which have reduced energy barriers for reactions important to syngas production. As a result, non-equilibrium plasma can improve the energy efficiency of syngas production. Experimental data in the art also illustrates increases in chemical conversion when non-equilibrium plasma is used. In addition, non-equilibrium plasma can be applied under conditions compatible with the instant technologies conversion process requirements, for example, temperature, pressure and residence time.

The GRS is designed to be able to convert the raw gas from a gasification reaction into a gas with a chemical makeup comprising smaller molecules, optionally in proportion and composition, desirable for downstream considerations.

Figure 4:
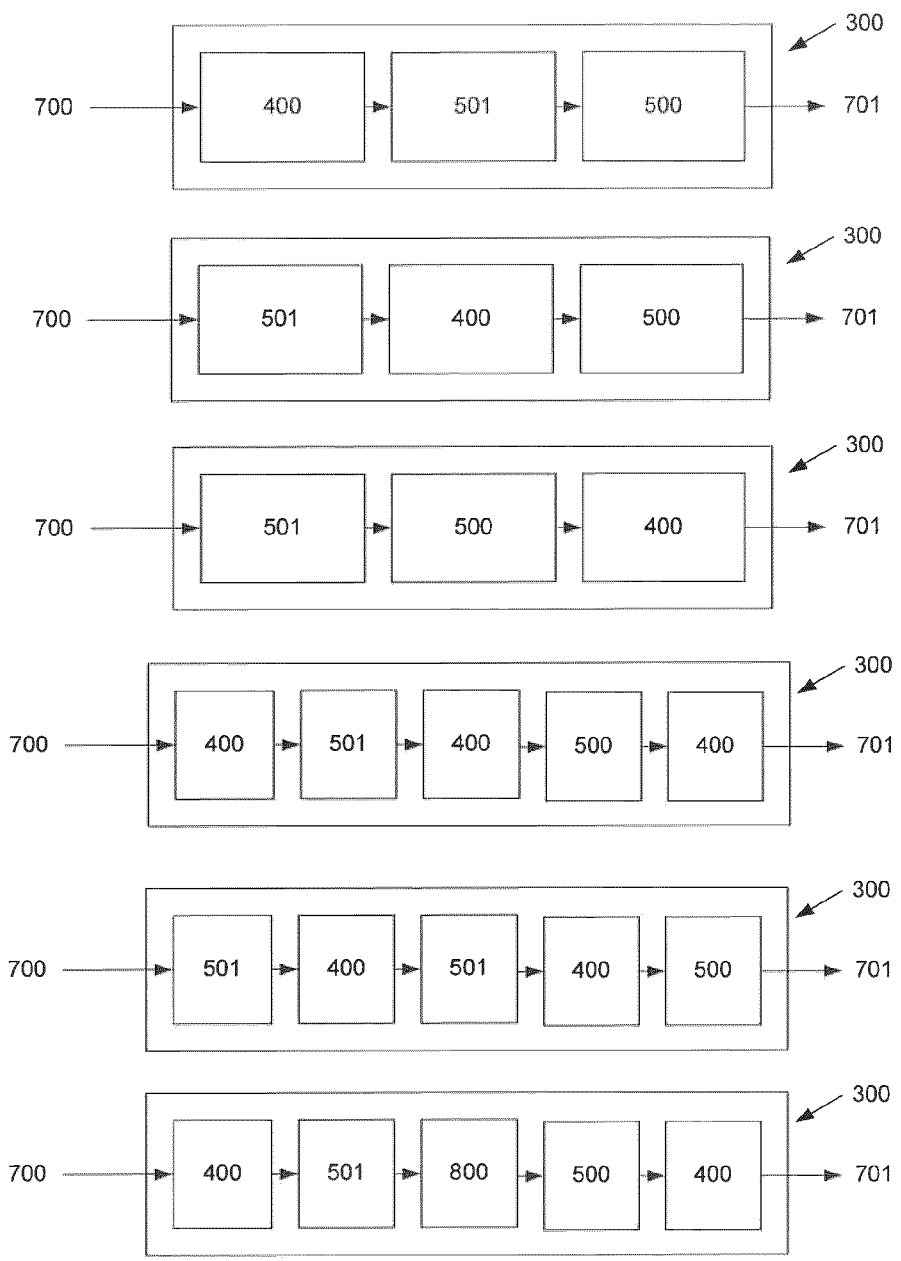
FIG. 4 illustrates various embodiments of non-equilibrium plasma 501 being used in combination with thermal plasma and solid catalysts. Refining chamber 300, raw gas stream 700 output gas stream 701 are shown.

In one embodiment and with reference to FIG. 4 non-equilibrium plasma reformulation is used in combination with thermal plasma and catalysts. FIG. 4 also illustrates various embodiments, where several combinations of non-equilibrium plasma 401, catalyst 400, thermal plasma 404, and mixing apparatuses 802 are envisioned. Unless catalyst reactions are significantly endothermic, non-equilibrium plasma will never follow thermal plasma reforming, without the addition of a cooling element/device 401.

Gas Reformulating System (GRS)

Referring to the Figures, the GRS comprises a gas reformulating chamber having one or more raw gas inlet(s), one or more reformulated gas outlet(s), one or more non-equilibrium plasma source(s) or means for generating non-equilibrium plasma, and optionally one or more oxygen source(s) input(s) and/or catalysts and/or a control system.

In some embodiments, non-equilibrium plasma is formed by providing an electrical discharge to the raw gas after addition of an oxygen source.

In other embodiments, the non-equilibrium plasma systems configuration is similar to the configuration of systems that use thermal plasma torches. In such systems, a working gas such as compressed air forms the plasma and this is used by injecting it into the reformulating chamber.

Figure 1B:
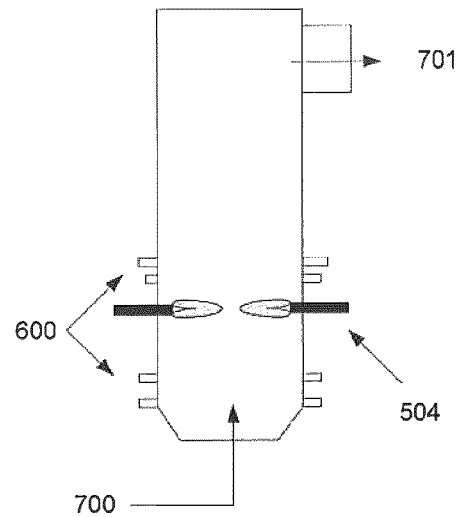
FIG. 1B illustrates one embodiment of the GRS with non-equilibrium plasma torch(es) 504.

In one embodiment and with reference to FIG. 1B, there is provided a gas reformulating system (GRS) comprising a gas reformulating chamber having one or more raw gas stream inlets 700, one or more reformulated gas outlets 701, one or more non-equilibrium plasma torches 504, and one or more additive inputs 600, which optionally includes air, $O_2$, steam, water, $CO_2$, CO, $H_2$, or some combination thereof, etc.

Figure 1C:
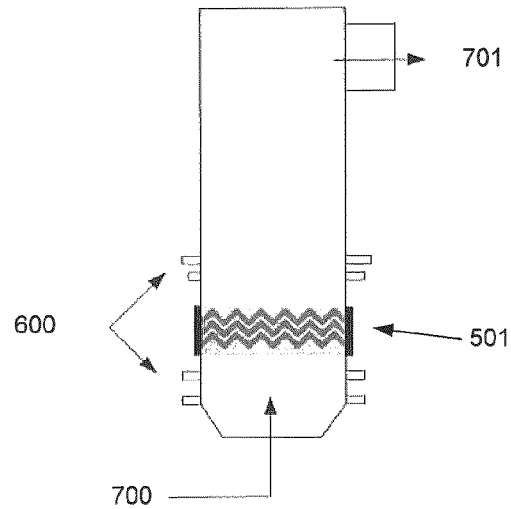
FIG. 1C illustrates one embodiment of the GRS with non-equilibrium plasma generator(s) or torch(es) 501.

In one embodiment and with reference to FIG. 1C, there is provided a gas reformulating system (GRS) comprising a gas reformulating chamber having one or more raw gas stream inlets 700, one or more reformulated gas outlets 701, non-equilibrium plasma generator 501, and one or more additive inputs 600, which optionally includes air, $O_2$, steam, water, $CO_2$, CO, $H_2$, or some combination thereof, etc.

Optionally, downstream of the GRS an induction blower in gaseous communication with the gas reformulating chamber may be provided to maintain the pressure of the gas reformulating chamber at a desired pressure, for example a pressure of about 0 to −5 mbar.

In one embodiment, the GRS is designed to be coupled directly to a gasifier such that the gas reformulating chamber is in gaseous communication with the gasifier. The gas reformulating chamber therefore receives raw gas directly from the gasifier. In such embodiments, the GRS may further comprise a mounting flange or connector for coupling the gas reformulating chamber to the gasifier. To facilitate maintenance or repair, the GRS may optionally be reversibly coupled to the gasifier such that the GRS, if necessary, may be removed.

In some embodiments, the GRS is an extension of the gasifier outlet.

In one embodiment, the GRS is a stand-alone unit which receives raw gas from one or more storage tank(s) or one or more gasifier(s) via piping or appropriate conduits. In such stand-alone units, the GRS may further comprise appropriate support structures.

Non-Equilibrium Plasma Sources

The GRS comprises one or more non-equilibrium plasma sources. Non-equilibrium plasma sources are known in the art and include non-equilibrium discharge generated by one of a dielectric barrier discharges (DBDs), gliding arc technology, direct-current (DC) and pulsed coronas, corona discharge, microwave plasma, Electron-beam and RF-driven discharges. A variety of gases have been used with plasma torches including, but not limited to $O_2$, $N_2$, Ar, $CH_4$, $C_2H_2$ and $C_3H_6$. A worker skilled in the art could readily determine the type of plasma torches that may be used in the GRS.

In one embodiment, the non-equilibrium plasma sources are one or more gliding arc plasma sources. In one embodiment, the non-equilibrium plasma sources are one or more corona discharge plasma sources.

In some embodiments, the non-equilibrium plasma source is means for forming an electrical discharge in the gas, such that non-equilibrium plasma is formed. Means for forming an electrical discharge are known in the art and include electrodes.

In some embodiments, electrodes are embedded or attached to the reaction chamber wherein the electrodes are separated by a gap. Optionally, the raw gas is injected into the gap between the electrodes.

In one embodiment, the raw gas is injected before or after the gap, between the plasma torch electrodes. In another embodiment the gas passing through the gap in the electrodes is an additive.

In one embodiment, the raw gas is subject to particulate removal to avoid plugging in the plasma reactor.

In one embodiment, the raw gas has been mixed with additives to balance the chemistry in the plasma reactor.

In some embodiments, the non-equilibrium plasma source is configured to increase raw gas contact with the plasma discharge, by passing at least part of the raw gas through the non-equilibrium plasma source.

In other embodiments, the majority of the raw gas is passed directly through the non-equilibrium plasma source.

In one embodiment, the non-equilibrium plasma sources are one or more gliding arc plasma sources. Optionally, the gliding arc plasma source is a reverse vortex gliding arc.

In one embodiment, the non-equilibrium plasma sources are one or more corona discharge plasma sources. Optionally, the corona discharge plasma source is a pulsed corona discharge. In one embodiment, the corona discharge has a wire-cylinder configuration.

In one embodiment, the non-equilibrium plasma source is a wet pulsed corona discharge system.

In one embodiment, the non-equilibrium plasma sources are one or more dielectric barrier discharge plasma sources. The dielectric barrier discharge may have a planar or cylindrical configuration.

In one embodiment, the non-equilibrium plasma source is a dielectric barrier discharge single tube reactor.

In one embodiment, the non-equilibrium plasma sources are one or more glow discharge plasma sources.

With reference to FIG. 2, in some embodiments the non-equilibrium plasma sources are gliding arc sources.

Figure 2A:
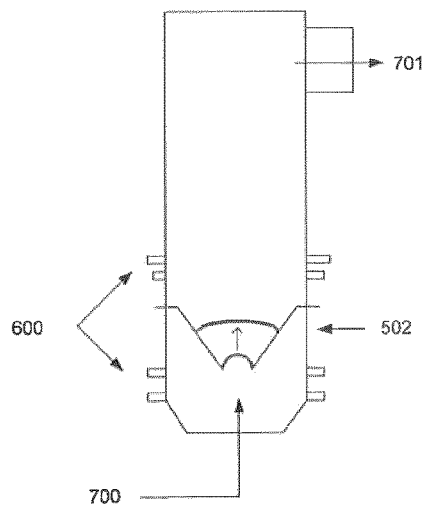
FIG. 2A illustrates a GRS with a single gliding arc apparatus 502.

In one embodiment and with reference to FIG. 2A, the gas reformulating system (GRS) comprises a gas reformulating chamber having raw gas stream inlets 700, reformulated gas outlets 701, and an internal mounted gliding arc apparatus 502.

Figure 2B:
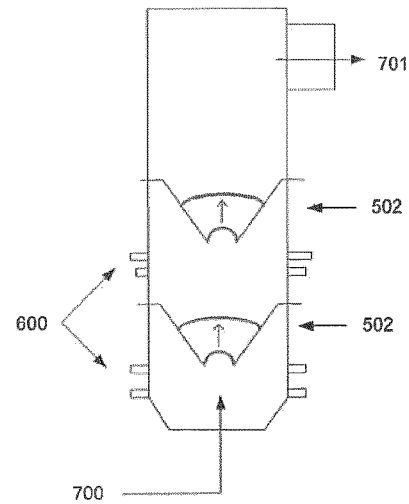
FIG. 2B illustrates a GRS with more than one gliding arcs.
Figure 2C:
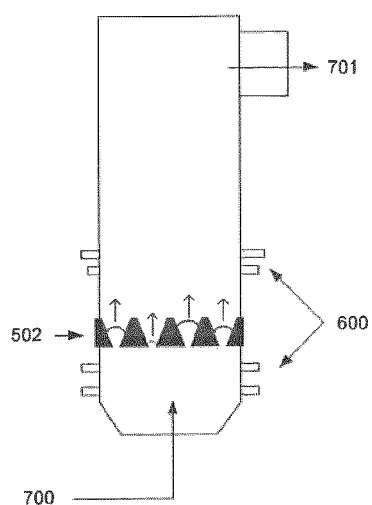
FIG. 2C illustrates a GRS having an array of gliding arcs in a supportive structure.
Figure 2D:
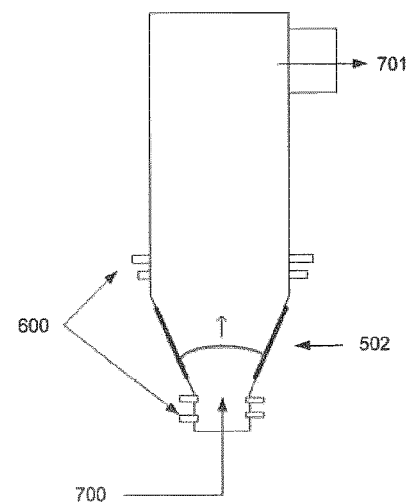
FIG. 2D illustrates a GRS with an arc generating apparatus installed in the sides of the chamber.

FIG. 2B illustrates the use of more than one gliding arc. It is not necessary that the arc be aligned in a particular way, as long as the arcs do not cross each other's path. FIG. 2C illustrates an array of gliding arcs in a supportive structure placed in the reformulating chamber.

Optionally the sides of the reformulating chamber can have an arc generating apparatus installed. In such embodiments, the chamber is modified to accommodate this feature. See FIG. 2D.

In one embodiment and with reference to FIGS. 2E and 2F, there are pluralities of gliding arc torches which create a charged non-equilibrium plasma field 506. With reference to FIG. 2G, the torches 508 may be located at different levels or heights along the chamber walls.

In one embodiment, there are two plasma sources that are positioned tangentially to create same swirl directions as air and/or oxygen inputs do.

In one embodiment, the plasma sources are positioned co-axially.

With reference to FIG. 3, in some embodiments the non-equilibrium plasma sources are corona sources 503.

In one embodiment and with reference to FIG. 3A, the non-equilibrium plasma source is a corona discharge 503 or pulse discharge system. Optionally the corona discharge is incorporated into the mixing elements 802 of the system, thereby providing for gas mixing and multiple passes through the non-equilibrium plasma (see FIG. 3B). In such an embodiment, gas travels up through the plasma field and down the down-flow tube 800 by the combined action of mixing apparatus 802 and fans 801.

In one embodiment and with reference to FIG. 3C, the non-equilibrium plasma source is an array of corona discharge generators 503 placed in the reformulation chamber.

In one embodiment, the corona discharge 503 is placed into the reformulation chamber with mixing technology 802.

Figure 3E:
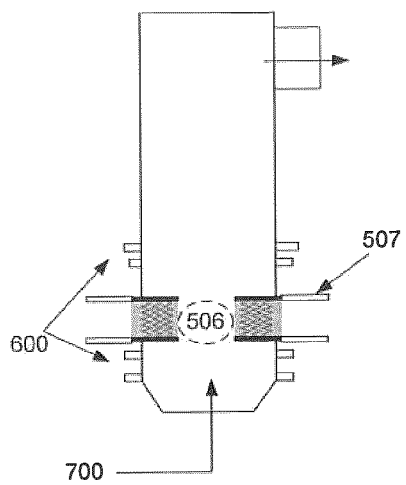
FIG. 3E illustrates a GRS with corona discharge torches 507 creating a charged non-equilibrium plasma field 506 for the purpose of reformulation and/or tar conversion.
Figure 3F:
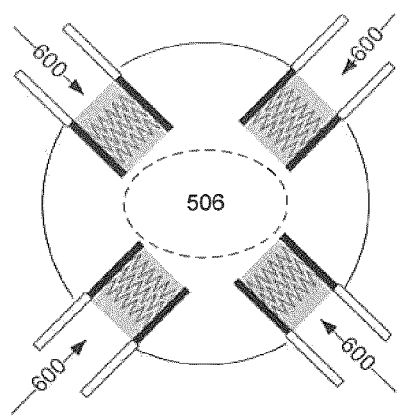
FIG. 3F is an alternative view of the embodiment shown in FIG. 3E.

In one embodiment and with reference to FIGS. 3E and 3F, there are pluralities of corona discharge torches 507 which create a charged non-equilibrium plasma field 506. Optionally, process additives inputs 600 provide additives including air, $O_2$, steam, water, $CO_2$, CO, $H_2$, or some combination thereof, etc are provided above and below the torch level.

In one embodiment, the process additives or their combinations are provided directly to the torch level.

Figure 3G:
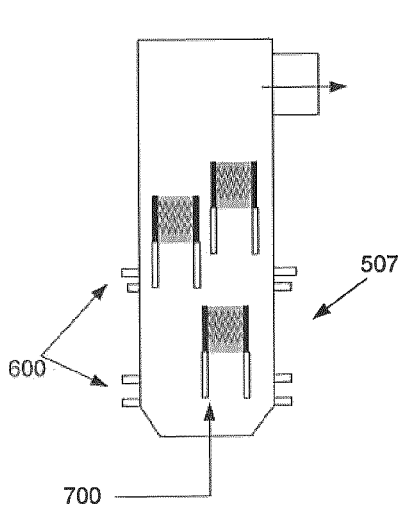
FIG. 3G illustrates a GRS with torches at different levels where torches are located along the chamber walls and producing non-equilibrium plasma in the reactor at various locations along the GRS. Down flow tube 800 is also shown.
Figure 3H:
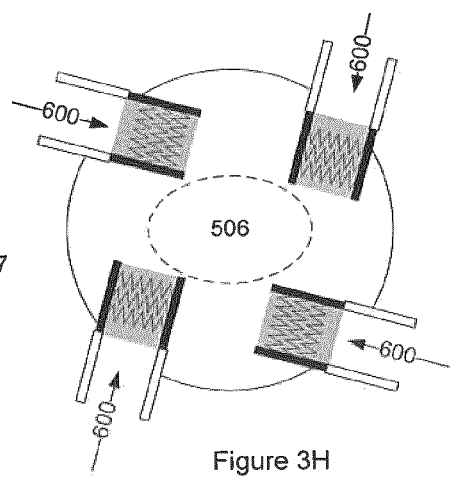
FIG. 3H illustrates a GRS with torches at different levels, where torches are located along the chamber walls such that non-equilibrium plasma is injected into the reactor at various heights, partially or fully tangential to the direction of the gas flow, in order to promote swirl in the reactor. Down flow tube 800 is also shown.

With reference to FIG. 3G, the torches 507 may be located at different levels or heights along the chamber walls.

A combination of pulsed corona with other gas treatment methods can be practical for applications. Pulsed corona can be combined with a catalyst to achieve improved results in the treatment of automotive exhausts and for hydrogen production from heavy hydrocarbons.

Another technological hybrid is pulsed corona coupled with water flow. Such a system can be arranged either in the form of a shower, which is called a spray corona, or with a thin water film on the walls, which is usually referred to as a wet corona.

Figures 5A, 5B:
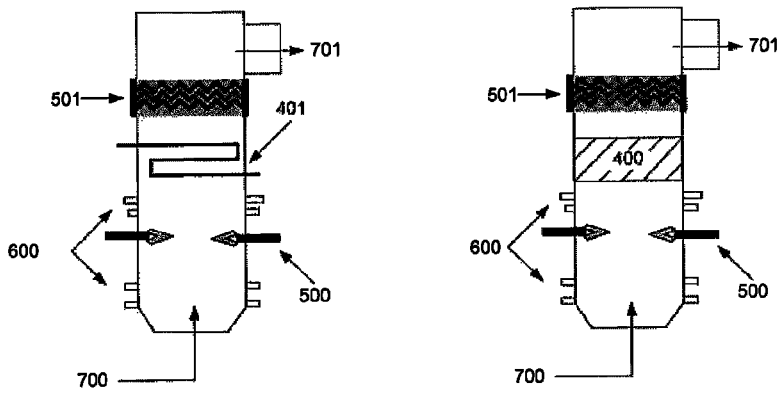
FIG. 5A illustrates a combination of thermal plasma 500 followed by cooling 401, then followed by non-equilibrium plasma 501.
FIG. 5B illustrates a combination of thermal plasma 500 followed by solid catalyst 400 (with endothermic reaction properties), then followed by non-equilibrium plasma 501.
Figure 5C:
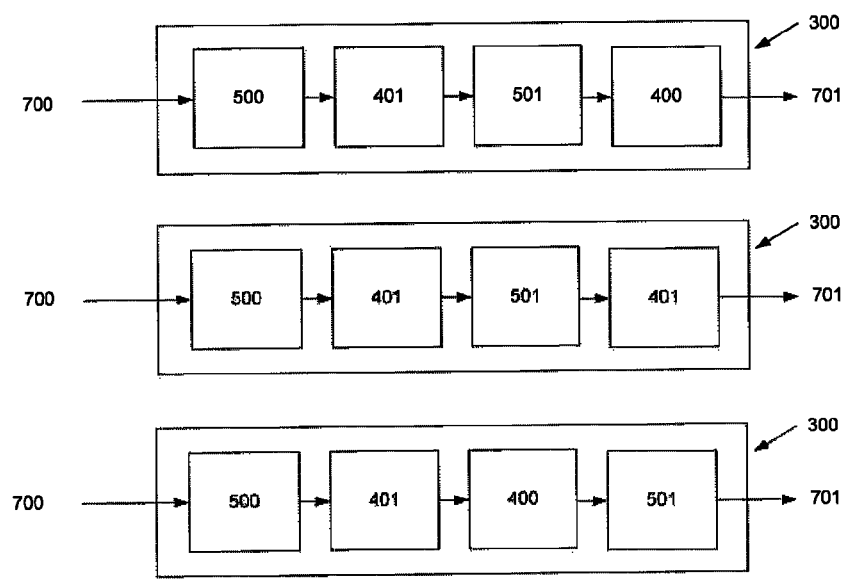
FIG. 5C illustrates combinations expanded on various parts, which result in the higher conversion efficiencies. Output gas stream 701 is shown.
Figure 6A:
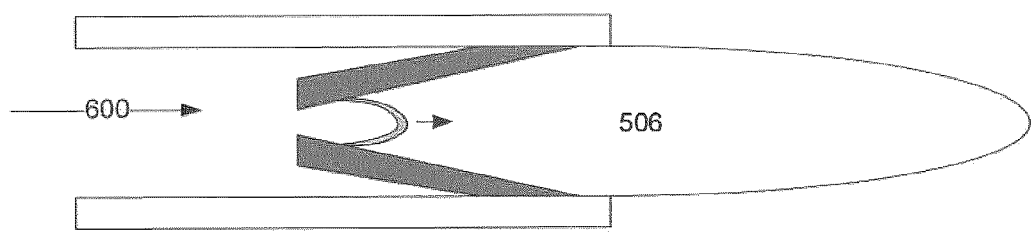
FIG. 6A illustrates gliding arc "torch" embodiment.
Figure 6B:
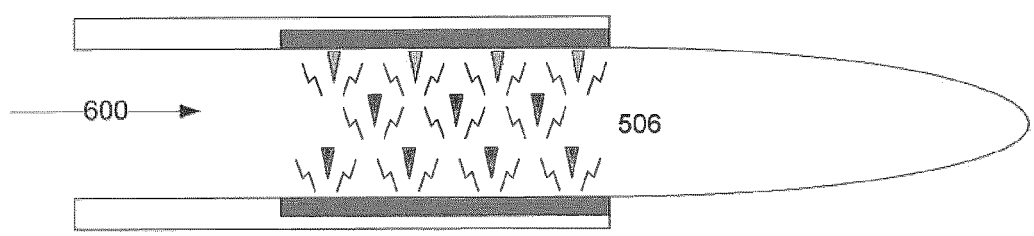
FIG. 6B illustrates pulsed corona/electrical discharge "torch" embodiment. Additive input 600 and charged non-equilibrium plasma field 506 are also shown in this figure.
Figure 7A:
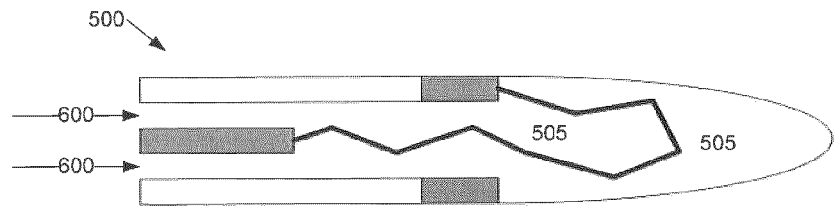
FIG. 7A illustrates a prior art Non-Transfer Thermal Plasma Torch 505.
Figure 7B:
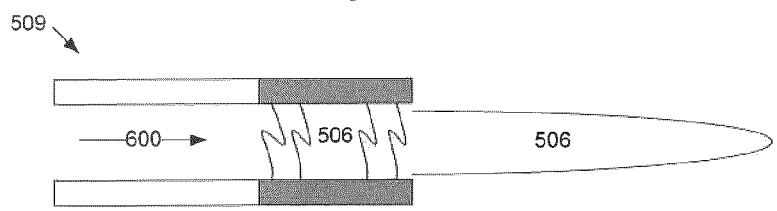
FIG. 7B illustrates a microwave generating a non-equilibrium plasma torch 509.
Figure 7C:
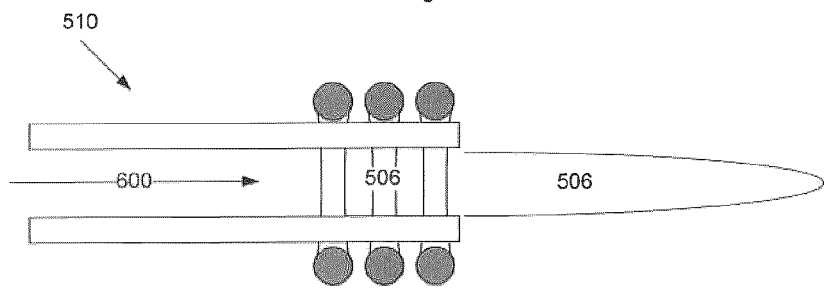
FIG. 7C illustrates a RF generating non-equilibrium plasma torch.
Figure 7D:
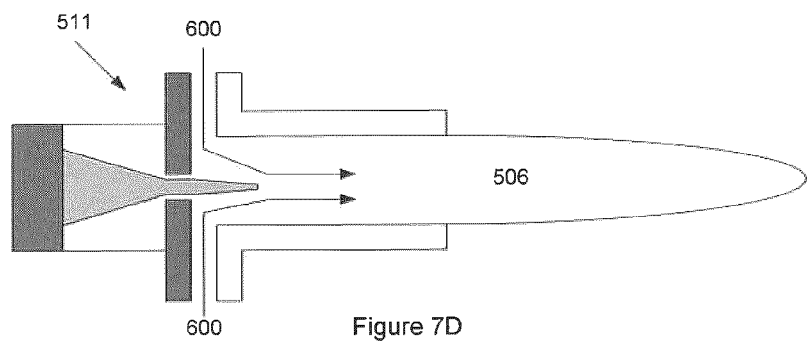
FIG. 7D illustrates an electron beam generating a non-equilibrium plasma torch 510. Charged non-equilibrium plasma field 506 and additive input 600 are shown.
Figure 8A:
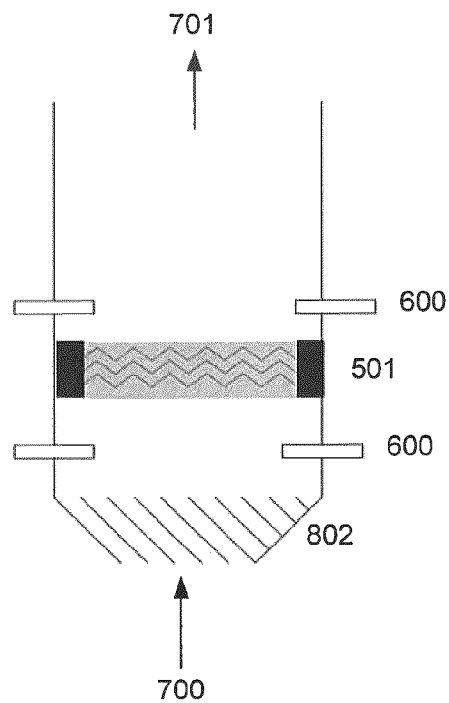
FIG. 8A illustrates one embodiment of the invention where the raw gas steam 700 is passing through a mixing system 802 causing the raw gas flow to become turbulent when additives 600 are added, because they mix with the raw gas prior to plasma reforming. Optional additives inputs 600 after the non-equilibrium plasma 501 and the output gas stream 701 are also shown.
Figure 8B:
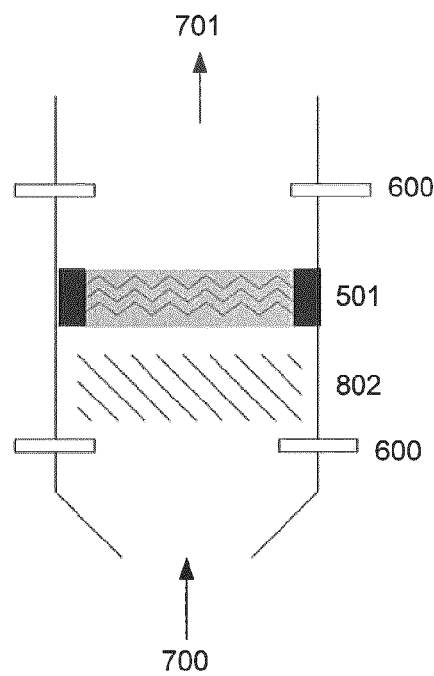
FIG. 8B illustrates one embodiment of the invention where the raw gas steam 700 is combined with additives 600 and flows into a mixing system 802, whereby the raw gas and additives 600 become well mixed prior to plasma reforming. Optional additives inputs 600 after the non-equilibrium plasma 501 are also shown.
Figure 8C:
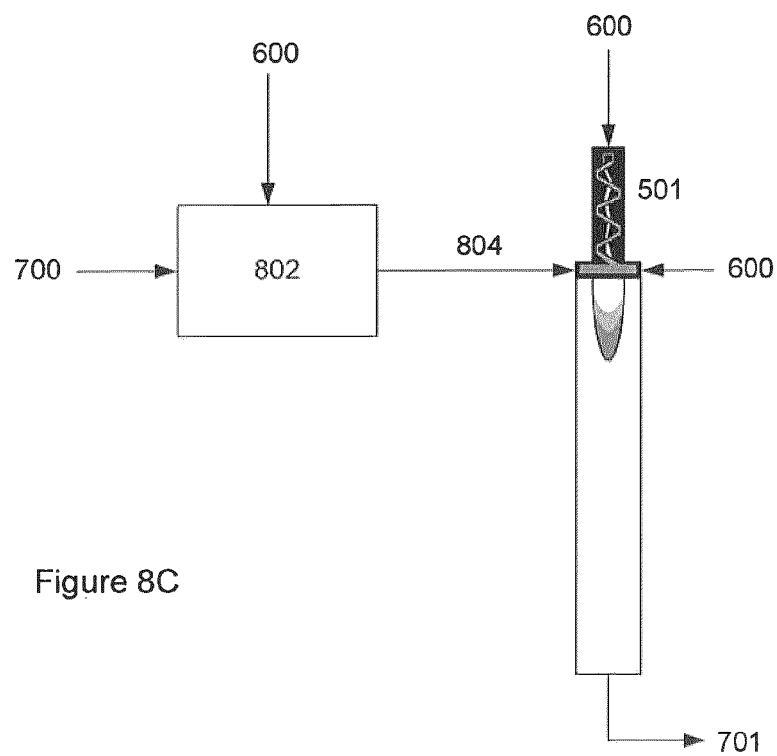
FIG. 8C illustrates a mixing system 802 in the form of a separate mixing chamber where the raw gas 700 steam and additives 600 are mixed together before the mixing chamber combined gas 804 is injected into a non-equilibrium plasma chamber, where all the gas is subject to plasma catalysis. Optional additives 600, both axially and tangentially, are shown in the plasma reactor, where they are injected along with the combined gas 804 from the mixing chamber.
Figure 16:
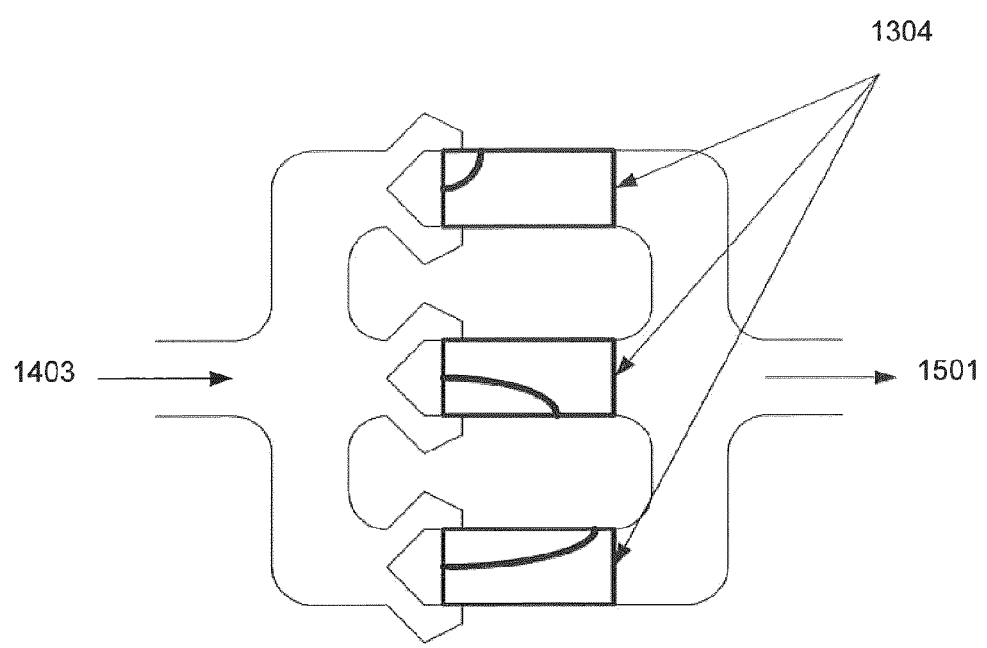
FIG. 16 illustrates a representation of multiple non-equilibrium plasma reactors from one stream of gas which is split into multiple lines (figure shows 3, but 2-10 can easily be considered) and then the reformulated gas lines are recombined before the gas is further processed downstream. This figure also shows the raw gas 1403, torches 1304 and reformulated gas 1501.

In one embodiment, non-equilibrium plasma reformulation is used in combination with thermal plasma and catalysts. In some embodiments, a cooling element or device 401 will be provided between the thermal plasma and the non-equilibrium plasma (see FIG. 5).

In one embodiment of the invention, raw gas temperature is between 350-650° C. and in the mixing/reformulation chamber it is raised to 650-950° C. prior to contact with plasma (either directly with the arc or torch) whereby this increase in temperature is achieved by mixing the raw gas with oxygenated additives. In one embodiment of the invention the additions injected to raise the temperature are they themselves hotter than the raw gas. In one embodiment of the invention the additions injected to raise the temperature are cooler or similar temperature to the raw gas.

Non-Equilibrium Plasma Use Considering Process Conditions

Non-Equilibrium Plasma or cold plasma has been experimentally demonstrated to be capable of breaking down large molecule hydrocarbons (tar) at low temperatures and therefore, can be used in a conversion system and/or gas reformulating system. Benefits of non-equilibrium plasmas vs. thermal plasma can be reduced temperature or energy for tar conversion and a simplified gas cleanup train.

The raw gas generated from the converter provides a set of conditions for the application of a non-equilibrium plasma option to tar conversion when it is considered, instead of high-temperature plasma torches in the refining chamber. The raw gas is high in both tar (on an order of 10-200 g/$Nm^3$) and particulate contents. Its major gaseous components include $H_2$, CO, $CO_2$, $N_2$ and $H_2O$. The raw gas has a relatively low temperature at about 300-850° C. and a flow of about 5000-8000 $Nm^3$/hr for the current 135 t/d facility. The following tar converting unit (refining chamber) provides 0.1-4 seconds of residence time for the gas and is operated under the close atmospheric pressure or under a vacuum condition. As a result, the requirement for a given non-equilibrium plasma configuration is to break down, under the above conditions, the tar present in the raw gas at the same (or better) efficiency achieved by the high-temperature plasma or do it by consuming less electricity.

The Gas Reformulating Chamber

The gas reformulating chamber has one or more raw gas inlets, one or more reformulated gas outlets, one or more ports for heaters and optionally one or more ports for oxygen source(s) inputs.

Raw gas enters the plasma-torch heated gas reformulating chamber through one or more raw gas inlet(s) in the chamber and is optionally blended by gas mixers or means for generating turbulence. Optionally, one or more input(s) are provided through which the oxygen source(s) are injected into the gas reformulating chamber. The one or more reformulated gas outlets enable the reformulated gas to exit the GRS and to be passed to downstream processes, for example, for further refinement or for storage at storage facilities.

In another embodiment of the invention; raw gas enters the gas reformulating chamber through one or more raw gas inlet(s) in the chamber and is optionally blended by gas mixers or means for generating turbulence and then is passed through an arc containing section where the gas and additives are converted into plasma. Optionally, one or more input(s) are provided, through which the oxygen source(s) are injected into the gas reformulating chamber. The one or more reformulated gas outlets enable the reformulated gas to exit the GRS and to be passed to downstream processes, for example for further refinement or for storage at storage facilities.

Shape and Orientation

The gas reformulating chamber may be of any shape, so long as it allows for the appropriate residence time to enable sufficient reformulating of the raw gas into reformulated gas. The gas reformulating chamber may be disposed in a variety of positions, so long as appropriate mixing of the raw gas occurs and a desired residence time is maintained.

The gas reformulating chamber can be oriented substantially vertically, substantially horizontally or angularly and have a wide range of length-to-diameter ratios ranging from about 2:1 to about 6:1. In one embodiment, the length-to-diameter ratio of the gas reformulating chamber is 3:1.

In one embodiment, the gas reformulating chamber is horizontally oriented.

In one embodiment, the gas reformulating chamber is a straight tubular or Venturi shaped structure comprising a first (upstream) end and a second (downstream) end and is oriented in a substantially vertical position or a substantially horizontal position.

In one embodiment, the gas reformulating chamber is positioned substantially horizontally or substantially vertically, has a volume designed to allow sufficient gas residence time to complete the cracking of hydrocarbon organic compounds in the raw gas, and a length/diameter ratio designed to ensure the gas velocity is in the optimization range.

Optionally, the gas reformulating chamber can include one or more chambers, can be vertically or horizontally oriented, and can have internal components, such as baffles, to promote back mixing and turbulence of the gas.

The gas reformulating chamber may optionally have a collector for solid particulate matter that can be collected and optionally fed into the gasifier for further processing or the solid residue compartments of a gasification system, such as a solid residue conditioning chamber, for further processing.

Collectors for solid particulate matter are known in the art and include, but are not limited to centrifugal separators, inertial impingement baffles, filters or the like.

In embodiments in which the GRS is directly coupled to the gasifier, additional solid particulate collectors may not be necessary as particulates formed may, in part, fall directly back into the gasifier.

In one embodiment, two or more electrodes are embedded within the chamber wall.

In one embodiment, the shape of the chamber is specifically adapted for the source of the non-equilibrium plasma.

Materials

The gas reformulating chamber can be made of temperature resistant metal insulated on the outside or it can be a refractory-lined chamber with an internal volume sized to accommodate the appropriate amount of gas for the required gas residence time or otherwise fabricated, so that it is able to withstand high temperatures.

Gas Inlets and Outlets

The gas reformulating chamber comprises one or more raw gas inlets or inputs or means to feed raw gas into the chamber for processing and one or more reformulated gas outlets or ports to pass the reformulated gas produced in the reformulating reactions to downstream processing or storage. In some embodiments, the inlet(s) for raw gas is located at or near the first or upstream end. The inlet may comprise an opening or, alternatively, may comprise a device to control the flow of raw gas into the gas reformulating chamber and/or a device to inject the raw gas into the gas reformulating chamber.

In one embodiment, the one or more raw gas inlets for delivering the raw gas to the gas reformulating chamber can be incorporated in a manner to promote concurrent, countercurrent, radial, tangential, or other feed flow directions.

In one embodiment, there is provided a single raw gas inlet with an increasing conical shape.

In one embodiment, the raw gas is inputted through the non-equilibrium plasma source.

In one embodiment, the inlet comprises the open first end of the gas reformulating chamber, whereby it is in direct gaseous communication with the gasifier.

In embodiments in which the gasifier and GRS are directly coupled, the attachment site on the gasifier for coupling to the GRS may be strategically located to optimize gas flow and/or maximize mixing of the raw gas prior to entering the gas reformulating chamber.

In one embodiment, the gas reformulating chamber is located at the center of the gasifier, thereby optimizing mixing of the raw gas prior to entering the gas reformulating chamber.

In one embodiment, the inlet comprises an opening located in the closed first (upstream) end of the gas reformulating chamber. This embodiment uses a raw gas inlet port to deliver the volatiles generated during gasification of carbonaceous feedstock into the chamber.

In one embodiment, the inlet comprises one or more openings in the wall of the gas reformulating chamber proximal to the first (upstream) end.

In one embodiment, the outlet comprises the open second (downstream) end of the gas reformulating chamber.

In one embodiment, the outlet comprises one or more openings located in the closed second (downstream) end of the gas reformulating chamber.

In one embodiment, the outlet comprises an opening in the wall of the gas reformulating chamber near the second (downstream) end.

Ports/Mountings

The gas reformulating chamber comprises various ports including one or more ports for heaters, one or more process additive ports, and optionally one or more access ports, view ports and/or instrumentation ports. The gas reformulating chamber may further comprise specific mountings or anchors for refractory, internal components, and plasma generators.

Heater ports include ports for primary heat sources including plasma torches and optional secondary sources.

In one embodiment, the gas reformulating chamber comprises one or more port(s) for mounting sources of non-equilibrium plasma.

In one embodiment, the gas reformulating chamber comprises two or more ports for mounting plasma torches.

In one embodiment, the gas reformulating chamber comprises three or more ports for mounting plasma torches.

In one embodiment, the gas reformulating chamber comprises four or more ports for mounting plasma torches.

In one embodiment, two ports are provided for plasma torches positioned at diametric locations along the circumference of the gas reformulating chamber.

In one embodiment, two ports are provided for tangentially mounting two plasma torches.

In one embodiment, the ports for the tangentially mounted plasma torches are located above the air inlets to provide maximum exposure to plasma torch heat.

Optionally, ports for mounting plasma torches may be fitted with a sliding mounting mechanism to facilitate the insertion and removal of the plasma torch(es) from the gas reformulating chamber and may include an automatic gate valve for sealing the port following retraction of the plasma torch(es).

Optionally, one or more process additive port(s) or inlet(s) are included to enable process additives, such as air, oxygen, carbon dioxide, other hydrocarbons or additional gases to be injected into the gas reformulating chamber. Optionally, ports or inlets are provided such that the reformulated gas not meeting quality standards may be re-circulated into the gas reformulating chamber for further processing. Ports or inlets may be located at various angles and/or locations to promote turbulent mixing of the materials within the gas reformulating chamber.

One or more ports can be included to allow measurements of process temperatures, pressures, gas composition and other conditions of interest.

In one embodiment, the gas reformulating chamber comprises appropriate port(s) for applying a non-equilibrium plasma generator(s).

In addition, the gas reformulating chamber may further include one or more ports for secondary torch heat sources to assist in the pre-heating or torch heating of the gas reformulating chamber.

Optionally, plugs, covers, valves and/or gates are provided to seal one or more of the ports or inlets in the gas reformulating chamber. Appropriate plugs, covers, valves and/or gates are known in the art and can include those that are manually operated or automatic. The ports may further include appropriate seals, such as sealing glands.

Oxygen Source(s) Ports

As noted above, the GRS comprises one or more inputs for oxygen source(s), the oxygen source(s) includes oxygen, oxygen-enriched air, air, oxidizing medium, steam and other oxygen sources as would be readily understood. Thus the gas conversion chamber comprises one or more ports for oxygen source(s) inputs.

In one embodiment, the gas reformulating chamber comprises one or more port(s) for air and/or oxygen inputs and optionally one or more ports for steam inputs.

In one embodiment, the gas reformulating chamber comprises one or more oxygen source(s) port(s). In one embodiment, the gas reformulating chamber comprises two or more oxygen source(s) ports. In one embodiment, the gas reformulating chamber comprises four or more oxygen source(s) ports. In one embodiment, the gas reformulating chamber comprises six oxygen source(s) ports. In one embodiment, there is provided nine oxygen source(s) ports arranged in three layers around the circumference of the gas reformulating chamber. The oxygen source(s) ports may be in various arrangements, so long as the arrangements provide sufficient mixing of the oxygen source(s) with the raw gas.

Gas Mixers and Turbulence Generators

The gas reformulating chamber may further optionally include one or more additional or supplementary gas mixers at or near the raw gas inlet to mix the raw gas, such that the raw gas is of more uniform composition and/or temperature and/or to mix the raw gas with process additives or oxygen source(s) and/or means for generating turbulence.

Gas Mixers and Turbulence Generators include those known in the art, see, for example, WO2008/138117, of the same applicant.

In one embodiment, the mixers may include one or more air jets (air swirl jets) at or near the raw gas inlet which inject a small amount of air into the raw gas and create a swirling motion or turbulence in the raw gas stream and thereby mix the raw gas.

In one embodiment, the mixer comprises two or more air swirl jets at or near the raw gas inlet, which inject a small amount of air into the raw gas and create a swirling motion or turbulence in the raw gas stream and thereby mix the raw gas by taking advantage of the injected air's velocity.

In one embodiment, the mixer comprises three or more air swirl jets at or near the inlet which inject a small amount of air into the raw gas and create a swirling motion or turbulence in the raw gas stream and thereby mix the raw gas.

In one embodiment, the mixer comprises four or more air swirl jets at or near the inlet which inject a small amount of air into the raw gas and create a swirling motion or turbulence in the raw gas stream and thereby mix the raw gas. The number of air swirl jets can be designed to provide substantially maximum mixing and swirl, based on the designed air flow and exit velocity, so that the jet could penetrate to the center of the chamber.

Baffles may also be used to induce mixing of the raw gas by creating turbulence in the raw gas. A baffle is a mechanical obstruction to the normal flow pattern. Baffles serve to block a section of the gas reformulation chamber cross section, resulting in a rapid increase in flow velocity and a corresponding rapid decrease on the downstream side of the baffle. This generates a high level of turbulence and speeds local mixing.

Baffles may be located at various locations in the gas reformulating chamber. Baffle arrangements are known in the art and, include but are not limited, to cross bar baffles, bridge wall baffles, choke ring baffle arrangements and the like. Accordingly, in one embodiment, the gas mixer comprises baffles.

Oxygen Source(s)

As noted above, the GRS comprises one or more oxygen source(s) inputs, the oxygen source(s) can include but not limited to oxygen, oxygen-enriched air, air, oxidizing medium and steam.

In one embodiment, the one or more oxygen source(s) input(s) comprise one or more air and/or oxygen and optionally one or more steam input(s).

In one embodiment, the air and/or oxygen and steam inputs comprise high temperature resistance atomizing nozzles or jets. Appropriate air nozzles are known in the art and can include commercially available types. A single type of nozzle or multiple different types of nozzles may be used in the GRS. The type of nozzle can be chosen based on functional requirements, for example a type A nozzle is for changing the direction of air flows for creating the desired swirls and a type B nozzle is for creating high velocity of air flow to achieve certain penetrations, and maximum mixing.

The nozzles can direct the air to a desired angle which is effective for mixing the gas. In one embodiment, the air jets are positioned tangentially. In one embodiment, angular blowing is achieved by having a deflector at the tip of the input nozzle, thus allowing the inlet pipes and flanges to be square with the gas reformulating chamber.

The arrangement of air and/or oxygen inputs is based on the diameter of the gas reformulating chamber, the designed flow and jet velocity, so that adequate penetration, substantially maximum swirl and mixing can be achieved. Various arrangements of the oxygen inputs or ports, steam inputs or ports and ports for plasma torches which provide sufficient mixing of the raw gas with the injected oxygen and steam and sufficient residence time for the reformulating reaction to occur are contemplated by the invention. For example, the oxygen inputs or ports, steam inputs or ports and ports for the plasma torches may be arranged in layers around the circumference of the gas reformulating chamber. This arrangement allows for the tangential and layered injection of plasma gases, oxygen and steam, which results in a swirling motion and adequate mixing of the raw gas with the oxygen and steam and provides a sufficient residence time for the reformulating reaction to occur.

In embodiments in which the air and/or oxygen input ports are arranged in layers, the air and/or oxygen input ports can optionally be arranged to substantially maximize the mixing effects.

In one embodiment, all the air and/or oxygen input ports are positioned tangentially thereby allowing the lower level input ports to premix the gas, torch heat it up, and start a swirl motion in the gas. The upper level air input ports can accelerate the swirl motion thereby allowing a re-circulating vortex pattern to be developed and persisted.

The arrangements of steam inputs or ports is flexible in number, levels, orientations and angle as long as they are located in a position to provide optimized capabilities to temperature control.

In one embodiment, the gas reformulating chamber comprises one or more steam inputs or ports. In one embodiment, the gas reformulating chamber comprises two or more steam inputs or ports.

The steam inputs or ports may be in various arrangements, so long as the arrangements provide sufficient mixing with the raw gas. In one embodiment there is provided two steam input ports arranged in two layers around the circumference of the gas reformulating chamber and positioned at diametric locations.

The oxygen and/or steam input ports may also be positioned, such that they inject oxygen and steam into the gas reformulating chamber at an angle to the interior wall of the gas reformulating chamber, which promotes turbulence or a swirling of the gases. The angle is chosen to achieve enough jet penetration and maximum mixing based on chamber diameter and designed air input port flow and velocity.

In one embodiment, the oxygen and/or steam inputs inject air and steam at an angle between about 10-70° from the interior wall of the gas reformulating chamber. In one embodiment, the oxygen and steam inputs inject air and steam at an angle between about 10-65° from the interior wall of the gas reformulating chamber. In one embodiment, the oxygen and steam inputs inject oxygen and steam at an about 60° angle from the interior wall of the gas reformulating chamber.

In one embodiment, the additives (air/steam, etc.) are added tangentially and/or axially to the gas flow direction to the chamber. In one embodiment the flow of additives promotes a swirl of gas in the reactor; in another embodiment it is directed to produce more turbulence and mixing.

In one embodiment, the air input ports can be arranged such that they are all in the same plane, or they can be arranged in sequential planes. The arrangement of air input ports is designed to achieve maximum mixing effects. In one embodiment the air input ports are arranged in lower and upper levels. In one embodiment, there are four air input ports at the lower level and another six air input ports at upper level in which three input ports are slightly higher than the other three to create cross-jet mixing effects to achieve better mixing.

In one embodiment, the gas reformulating chamber includes oxygen inputs, steam input ports, and ports for plasma torches that are arranged, such that there is adequate mixing of the gases and steam throughout the chamber.

Optionally, air can be blown into the chamber angularly, so that the air creates a rotation or cyclonic movement of the gases passing through the chamber. The plasma torches may also be angled to provide further rotation of the stream.

Combination Systems

Optionally, in some systems non-equilibrium plasma reformulation is combined with thermal plasma and/or catalytic reformulation processes.

Appropriate thermal plasma and catalysts are known in the art and include those disclosed, for example, in WO2008/138117.

Control System

The system may further comprise a control system. Appropriate control systems are known in the art and include those disclosed, for example, in WO2008/138117.

Example: Side-Stream Testing at Plasco Energy Group's Trail Road Facility (PTR)

Overview:

Raw gas was withdrawn from the gasifier at a temperature around 300-650° C. The raw gas was passed through a small cyclone for bulk particulate removal. The removal of particulates is necessary to prevent plugging in the non-equilibrium plasma reactor.

The particulate-free raw gas then entered a mixing chamber where it mixed with preheated air between 300 to 400° C. and was given time to come to equilibrium. The aim of mixing particulate-free raw gas with air was to adjust the raw gas to oxidizer ratio prior to the test section. The residence time in the mixing chamber was controlled to ensure adequate time for partial thermal oxidation to raise the temperature of the raw gas to approximately 650-950° C. at the exit of the mixing chamber.

After the particulate-free, raw gas was mixed with air, the mixture was introduced into the test GRS where the performance of 10 kW gilding arc reactor was evaluated under different operating conditions. The mixing chamber outlet gas passed through the gliding arc reactor, where it was subjected to plasma processing through direct contact with the gliding arc discharge. The higher molecular weight hydrocarbons were dissociated, via plasma catalysis, into smaller gaseous molecules such that the major components of the reformulated gas were $H_2$, CO, $CO_2$, $N_2$, and $H_2O$. Furthermore, tar species (hydrocarbons with molecular chains/rings larger than benzene) were reduced in volumetric quantity between 36.9% to 92.4%. Furthermore, the heating value of the gas increased (as calculated using only the main constituents of the reformulated gas).

Figure 17:
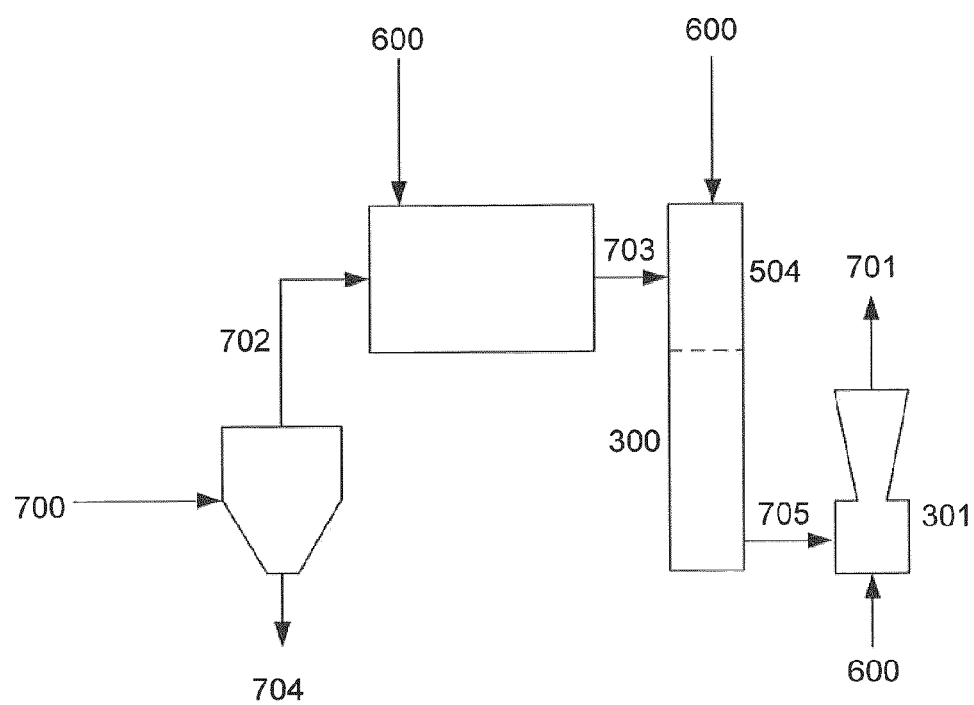
FIG. 17 is a schematic diagram of side stream system detailing the refining chamber 300; eductor 301; the non-equilibrium plasma "torch" 504; process additives 600 including air, $O_2$, steam, water, $CO_2$, CO, $N_2$, $H_2$, or some combination thereof; raw gas input stream 700; reformulated gas output stream 701; particulate reduced raw gas 702; particulate matter 703; 704; reformulated gas 705.

The reformulated gas was driven through the side stream via a suction system. Then, the reformulated gas was returned back to primary process stream. A schematic diagram of the side stream test section is shown in FIG. 17.

Design of Experiment

There are four main parameters/factors affecting the performance of the gliding arc reactor. These parameters are specific energy input (SEI), air equivalence ratio, gas flow rate and ratio of air injected in the mixer to the air injected in gliding arc reactor. All possible combinations of these parameters were investigated thoroughly to allow for detection of any curvature or peak points in the gliding arc performance. A 10 kW gliding arc reactor has been tested for a range of air flow rates and SEIs. Flow rate varied from about 20 to about 50 m$^3$/hr. SEI varied from about 0.05 kWh/m$^3$ to about 0.15 kWh/m$^3$. Stable operation of plasma discharge was observed in the flow rate ranging from about 20 to about 40 m$^3$/h.

A cyclone was used to remove particles of 5.3 μm at 50% capture efficiency.

A mixing chamber was used to ensure effective mixing between raw gas and gasifying agent (air). In addition to effective mixing, the mixing chamber was designed to initiate tar conversion via partial oxidation. Raw gas was injected axially through a 45° swirler, while air was injected outwardly through the center of the swirler.

The mixing chamber was maintained at about 950° C. so that the exit temperature of the reformulated gas was between about 650° C. to about 850° C. The gliding arc reactor was designed and tested to operate in this range of temperature. Furthermore, in bench scale experiments, the gliding arc reactor exhibited high performance in terms of tar conversion, 90 to 97%, in this temperature range.

The performance of gliding arc reactor was quantitatively validated by measuring tar reduction; gas flow rate; gas quality and energy gain.

Gas was sampled before and after the gliding arc reactor to quantify the amount of tar reduction. Sampled gas was filtered and quantified (total gas sampled, in liters for example). A sample, with a known weight of tar-solvent mixture, was filtered and introduced to a Gas Chromatograph (GC) analyzer along with an internal standard in order to quantify each component in the tar sample. Along with the gas measurement, tar analysis was used to obtain the content of tar in gas (g tar/Nm$^3$ gas).

Total gas flow rate at the suction pump port was measured by analyzing the gas before entering the suction pump at the suction port, and after mixing with the motive fluid (nitrogen). Nitrogen flow rate was accurately measured and controlled using a thermal flow meter. The increase in nitrogen concentration was attributed to a known flow rate of nitrogen. Consequently, flow rates of main gas constituents were calculated.

The increase in gas flow rate was calculated by analyzing the gas just before the gliding arc reactor. Nitrogen flow rate at the inlet of the gliding arc reactor equals the nitrogen flow rate after the gliding reactor (entrance of suction pump) minus nitrogen flow rate in the air stream. Knowing the nitrogen flow rate at each point, before and after the plasma reactor, enables calculation of the total gas flow rate, as well as its constituents.

The gas was analyzed to determine its quality; $H_2$, $CH_4$, CO, $N_2$ and $CO_2$ content and LHV based on the LHV of each pure component.

Figure 18:
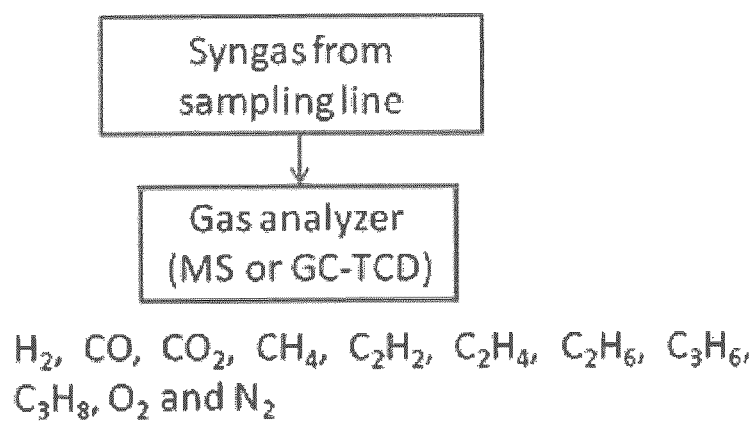
FIG. 18 is a block diagram of the general sampling system.

Tar was analyzed using a GC-FID gas analyzer or a GC-MS gas analyzer. Gas was analyzed using a mass spectrometer. Detected species were $H_2$, CO, $CO_2$, $N_2$, $O_2$, $CH_4$, $C_2H_2$, $C_2H_4$ and $H_2O$. FIG. 18 is a block diagram of a general sampling system.

Results:

Mass spectroscopy has been used to analyze the raw gas before the mixer, after the mixer, and the syngas after the plasma reactor (NEP) and after the eductor. Gas analysis has been used to calculate lower heating value (LHV), flow rate, carbon flow rate, energy flux at each stage, and energy gain from tar conversion. Gas flow rate has been calculated using the nitrogen balance throughout the process.

A GC FID has been used to analyze GC detectable tars. Twenty components have been identified ranging from benzene to benzo-pyrene. Detectable tar can be classified into secondary tars, tertiary tars, unidentified tars (but still detected) and tars with carbon number greater than 15.

Unidentified tars were calculated using the following procedure: The raw data adjusted for the base line was manually integrated to find the total area under the GC chromatogram. This area was subtracted by the total integrated area for the identified tars from the GC software. This subtracted area represents the area of the unidentified tars. The ppm of the unidentified tars was estimated by multiplying the area of the unidentified tars by the ratio of total ppm of identified tars over the area of identified tars.

Approach for Adjusting Air Flow Rate

Air flow rate was adjusted manually during the experiments to maintain a balance between syngas LHV and tar conversion benchmark values. High air to fuel ratio resulted in complete tar conversion at the expense of syngas quality/LHV and heat flux of syngas produced. Low air to fuel ratio resulted in an increase in LHV at the expense of tar conversion. All experiments started with a high air flow rate in which almost all gas was combusted, and then air flow was lowered gradually while monitoring gas chemical composition using the online mass spectrometer (MS). By lowering the air flow rate, concentration of key constituents of syngas including CO, $H_2$, $CH_4$ and $C_2H_4$ gradually increased. The air flow was kept at a steady flow rate when an LHV of about 2.5 to about 3.5 MJ/Nm$^3$ was achieved. The actual value of syngas LHV varied from approximately 1.2 MJ/Nm$^3$ to 3.9 MJ/Nm$^3$.

MS Results

Figure 19:
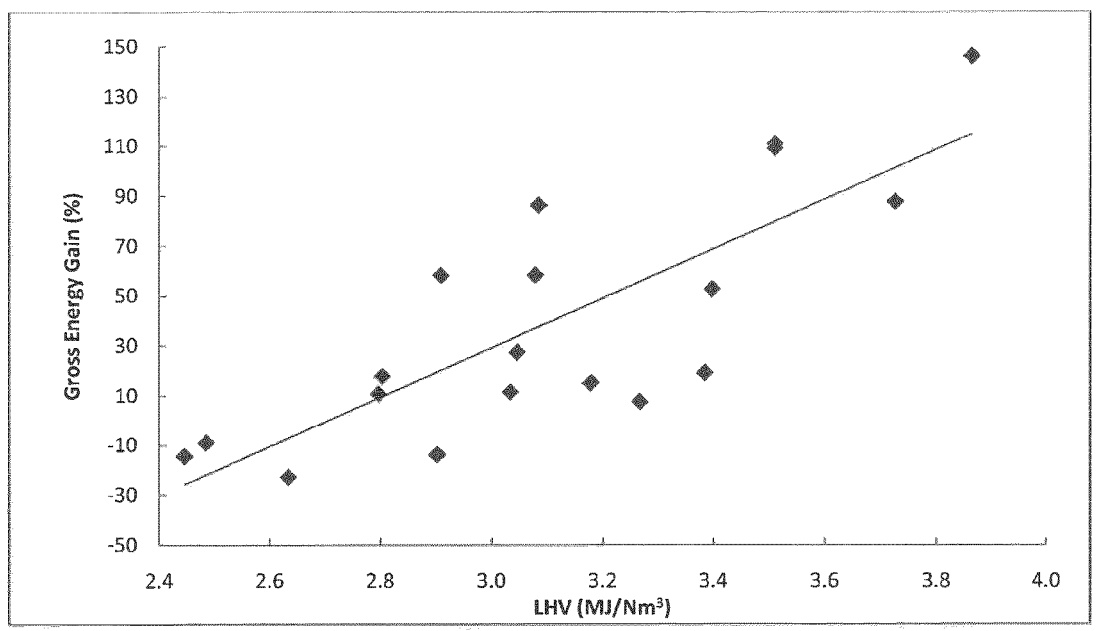
FIG. 19 shows percentage of gross energy gain as a function of lower heating value (LHV) (syngas).

A correlation was found between energy gain and syngas LHV (FIG. 19). The percentage of energy gain increased proportionally with the increase in syngas LHV indicating that the main reason for achieving good energy gain was by sustaining a relatively high LHV, more than 3 MJ/Nm$^3$.

Figure 20:
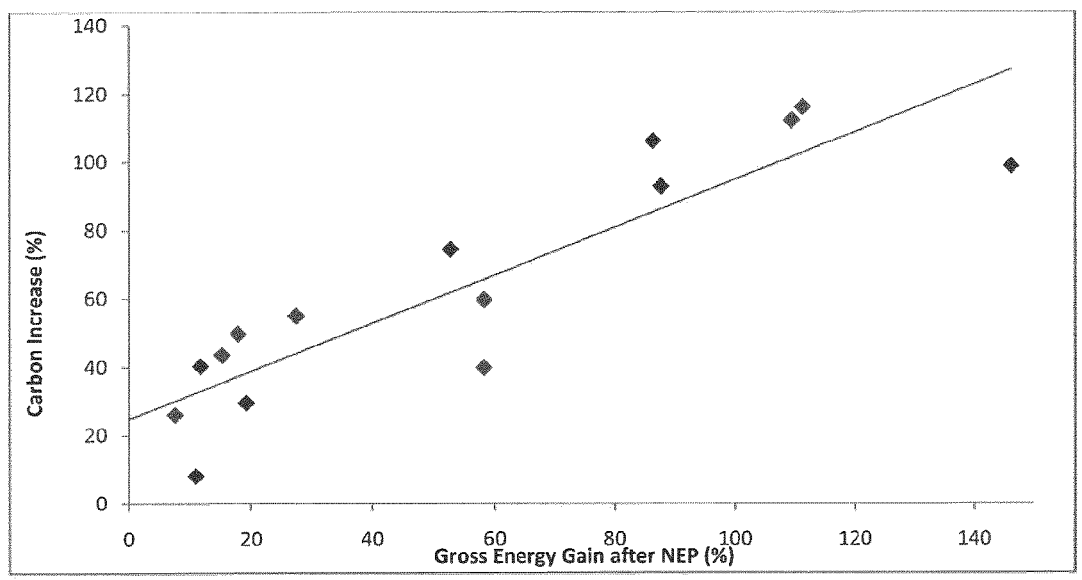
FIG. 20 shows percentage of carbon increase as a function of gross energy gain.

The percentage of energy gain also correlates with the percentage of carbon increase in syngas. The percentage of carbon increase is defined as the difference in carbon flow rate between syngas and raw gas divided by the carbon flow rate of the raw gas. Increased syngas carbon content is only achievable via tar conversion. The percentage of carbon content increase in the syngas varied from approximately 20% to 110%. This correlation indicates that high energy gain is achieved when raw gas has relatively high tar content since tar is the only source of carbon that can result in an increase in carbon content/flow rate (FIG. 20).

Figure 21:
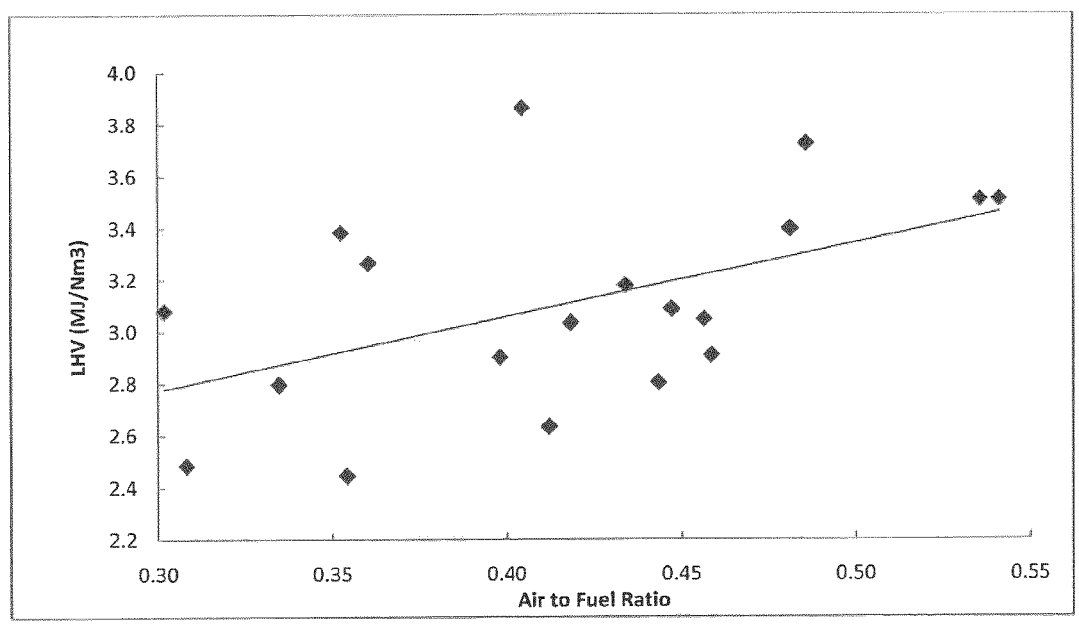
FIG. 21 shows LHV as a function of air to fuel ratio.

Shown in FIG. 21 is a correlation between air to fuel ratio and syngas LHV. The air to fuel ratio is defined as the ratio of the total air volume flow rate (introduced into the mixer and the NEP reactor) to the syngas volume flow (after the NEP reactor). It is clear from FIG. 21 that the LHV increased with the air to fuel ratio within the ratio range of 0.3-0.55. The trend shown in FIG. 21 provides strong evidence that the tar conversion to syngas was a prevailing process over the syngas combustion as the air to fuel ratio was increased. Otherwise, this increased air to fuel ratio would have resulted in syngas combustion as the prevailing process.

Figure 22:
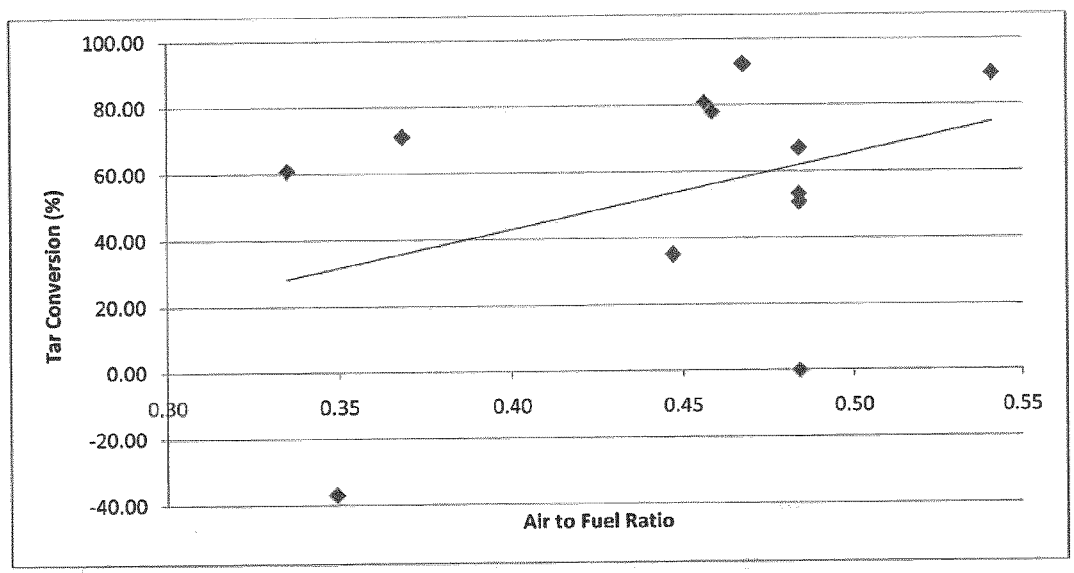
FIG. 22 shows percent tar conversion as a function of air to fuel ratio.

Shown in FIG. 22 are the LHVs and percentage of energy gain for the range of SEIs tested. SEI varied from 0.04 to 0.16 KW*hr/Nm$^3$. In most cases, high values of LHVs and energy gain have been achieved over the tested range of different SEIs.

Figure 24:
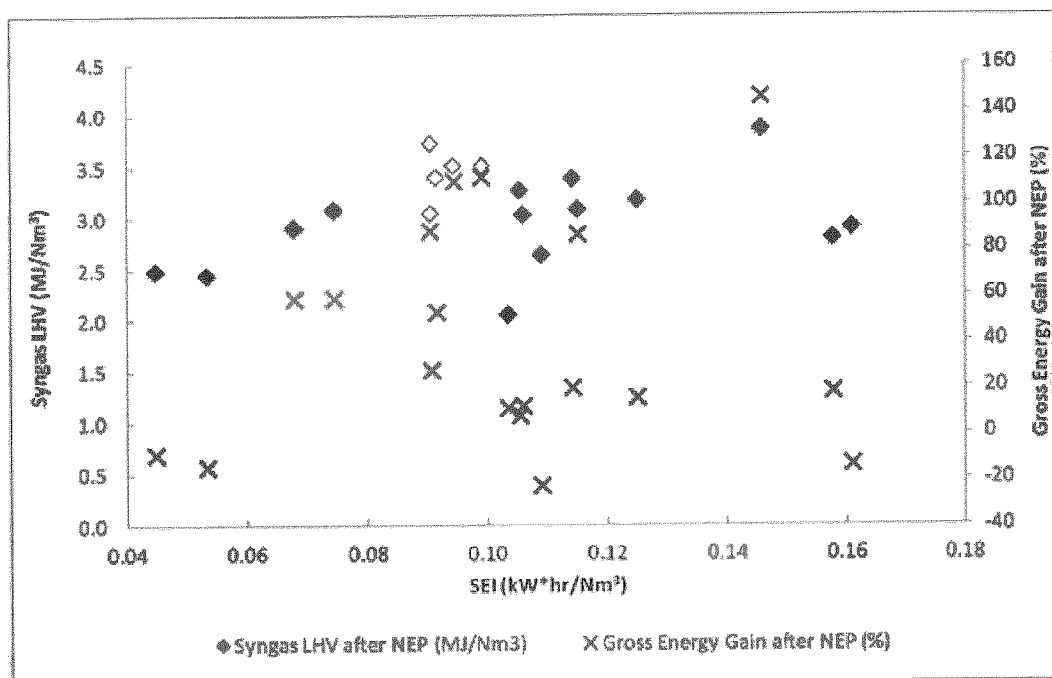
FIG. 24 shows LHV and percentage of energy gain for various SEIs values, white diamonds indicate preferred values.

Due to the plant's requirements to maintain a syngas LHV that results in stable and efficient gas engine operation while minimizing the SEI of the reformulation process, operation between about 0.09 and about 0.10 kWh/m$^3$ of gas with an LHV of about 3.4 to about 3.7 MJ/Nm$^3$ can be selected from operating results that were achieved under the present operating conditions. Tar conversion was measured at one point under these general operating conditions. The measured tar conversion was about 89%. See FIG. 24.

GC Results

Figure 23:
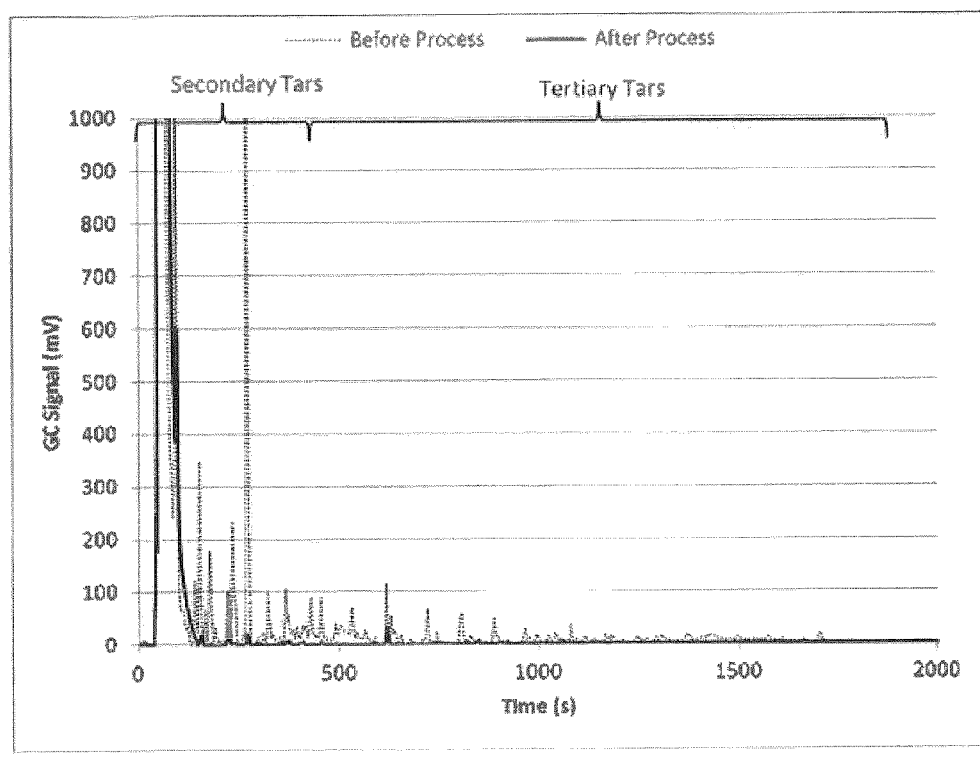
FIG. 23 shows the ratio of remaining secondary and tertiary tars after processing.

Shown in FIG. 23 is the ratio of GC identified tar after the NEP to that before reforming as a function of air to fuel ratio. The increase in air to fuel ratio resulted in an increase in conversion of GC detectable tars. Negative values do not indicate increased tar content during the process; but instead indicate a shift of gravimetric tars (non-GC detectable tars) from higher molecular weight to lower molecular weight compounds. It is worth considering the trend observed in FIG. 21 along with what is observed in FIG. 23. In FIG. 21, LHV increased proportionally with the increase in air to fuel ratio. As indicated previously, tar loading at high air to fuel ratio runs was associated with high values of tar loading. FIG. 23 also shows an increase in tar conversion (decrease in detectable GC tars) with the increase in air to fuel ratio. This demonstrates that the process efficiency in tar conversion is not hindered by high tar loading.

GC-FID identifiable tars were categorized as secondary tars and tertiary tars. Secondary tars consist of mono-aromatic compounds while tertiary tars consist of PAHs and compounds with carbon number higher than 15. Conversion of tertiary tar was found to vary from 40 to 80%. Possible routes for this reduction are higher molecular weight PAH and soot formation or breaking down to smaller molecules such as benzene or other mono-aromatic compounds. In some samples increased secondary tar was observed. This can be attributed to conversion of some PAHs/tertiary tars to their main constituents, mono aromatic compounds/secondary tar.

In order to better understand the effect of the NEP on tar concentration and distribution, a typical example of GC chromatogram is shown in FIG. 23. The GC chromatogram shows the signal measured by the flame ionization detectors (FID) as a function of residence time. Lighter tars with smaller MW (and carbon number) are detected early in reading. The heavier tars with larger molecular weight (and carbon numbers) take longer to travel through the GC and subsequently take longer to be detected. FIG. 23 shows the approximate area where the secondary and tertiary tars are detected by the GC. The area under the graph is proportional to the quantity of tar. It is clear from the graph that there is a shift from the tertiary tars, which decreased, towards the secondary tars, which subsequently increased. This shift in tertiary tar can be a result of formation of higher PAHs and soot or decomposition to mono-aromatic compounds/secondary tar.

The invention being thus described, it will be apparent that the same may be varied in many inventions, and all such modifications as would be apparent to one skilled in the art are intended to be included within the scope of the following claims.

The embodiments of the invention in which an exclusive property or privilege is claimed are defined as follows:

1. A method for reformulating a raw gas from a gasification reaction comprising the steps of:
   a. removing particulates from the raw gas to obtain a particulate-free raw gas;
   b. delivering the particulate-free raw gas to a mixing chamber;
   c. injecting air pre-heated to a temperature of between 300-400° C. into the mixing chamber to obtain a mixture;
   d. maintaining the mixture in the mixing chamber for a residence time sufficient to raise the temperature of the mixture to about 650-950° C. by partial thermal oxidation to obtain a pre-heated mixture;
   e. contacting the pre-heated mixture with an electrical discharge such that a non-equilibrium plasma is formed, thereby producing a reformulated gas; and
   f. removing the reformulated gas from the chamber.

2. The method of claim 1, wherein the non-equilibrium plasma is formed by at least one of dielectric barrier discharge, gliding arc, direct-current and pulsed coronas, corona discharge, microwave plasma, electron-beam, microdischarge and Radio Frequency (RF)-driven discharge.

3. The method of claim 1 comprising an addition of one or more process additives.

4. The method of claim 1, wherein one or more process additives are added concurrently with formation of the non-equilibrium plasma within the mixture.

5. The method of claim 1, comprising exposing one or more of the particulate-free raw gas, the mixture, or the reformulated gas to a catalyst.

6. The method of claim 1 further comprising adjusting an air to the particulate-free raw gas ratio to obtain the mixture.

7. The method of claim 6 comprising adjusting the air to the particulate-free raw gas ratio to between about 0.2 to about 0.6.

8. The method of claim 6 comprising adjusting the air to the particulate-free raw gas ratio to between about 0.3 to about 0.5.

9. The method of claim 6, wherein air to the particulate-free raw gas ratio is adjusted based on reformulated gas quality.

10. The method of claim 6, wherein air to the particulate-free raw gas ratio is adjusted to maintain a lower heating value (LHV) of the reformulated gas within a specific range.

11. The method of claim 10, wherein the specific range is between 1.2 MJ/Nm$^3$ and 3.9 MJ/Nm$^3$.

12. The method of claim 10, wherein the specific range is between 3.4 MJ/Nm$^3$ and 3.7 MJ/Nm$^3$.

13. The method of claim 10, wherein the specific range is between 1.2 MJ/Nm$^3$ and 3.9 MJ/Nm$^3$.

14. The method of claim 10, wherein the LHV is about 3 MJ/Nm$^3$.

15. A method for reformulating a raw gas from a gasification reaction comprising the steps of:
   a. mixing the raw gas with air pre-heated to a temperature of between 300-400° C. to obtain a mixture;
   b. maintaining the mixture in a mixing chamber for a residence time sufficient to raise the temperature of the mixture to about 650-950° C. by partial thermal oxidation to obtain a pre-heated mixture; and
   c. directly contacting the pre-heated mixture with a gliding arc discharge, thereby producing a reformulated gas.

* * * * *